(12) United States Patent
Mukkamala et al.

(10) Patent No.: US 10,234,853 B2
(45) Date of Patent: Mar. 19, 2019

(54) SYSTEMS AND METHODS FOR MANAGING INDUSTRIAL ASSETS

(71) Applicant: General Electric Company, Schenectady, NY (US)

(72) Inventors: Himagiri Mukkamala, San Ramon, CA (US); Steve Winkler, San Ramon, CA (US); Subrata Roy, San Ramon, CA (US); Harel Kodesh, San Ramon, CA (US); Marc-Thomas Schmidt, Winchester (GB); Michael Hart, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 76 days.

(21) Appl. No.: 15/394,462

(22) Filed: Dec. 29, 2016

(65) Prior Publication Data
US 2017/0192414 A1    Jul. 6, 2017

Related U.S. Application Data

(60) Provisional application No. 62/273,782, filed on Dec. 31, 2015.

(51) Int. Cl.
*G05B 19/418* (2006.01)
*H04L 29/06* (2006.01)
(Continued)

(52) U.S. Cl.
CPC ..... *G05B 19/41885* (2013.01); *G06F 3/0482* (2013.01); *G06F 3/04842* (2013.01);
(Continued)

(58) Field of Classification Search
CPC .......... G05B 19/41885; H04L 63/0876; H04L 43/045; H04L 63/0823; H04L 41/12;
(Continued)

(56) References Cited

U.S. PATENT DOCUMENTS 6,421,571 B1 * 7/2002 Spriggs .................. G05B 15/02
345/629
7,313,465 B1 * 12/2007 O'Donnell ............. G06Q 50/06
323/237

(Continued)

FOREIGN PATENT DOCUMENTS

EP    2801936 A1    11/2014

OTHER PUBLICATIONS

"The Essential OAuth Primer: Understanding OAuth for Securing Cloud APIs", Ping Identity, [Online]. Retrieved from the Internet: <URL: https://www.pingidentity.com/en/resources/white-papers/oauth-primer.html, (2015), 1-10.
(Continued)

*Primary Examiner* — Ramesh B Patel
(74) *Attorney, Agent, or Firm* — Buckley, Maschoff & Talwalkar LLC

(57) ABSTRACT

Systems and methods described herein are configured for managing industrial assets. In an example embodiment, information about industrial assets or their use conditions, such as gathered from sensors embedded at or near industrial machines or assets themselves, can be aggregated, analyzed, and processed in software residing locally or remotely from the assets. In an example embodiment, applications can be provided to optimize an industrial asset for operation in a business context. In an example embodiment, a cloud-based asset management platform can include development tools to facilitate development, by end-users, of applications for interfacing with and optimizing industrial assets, and for managing relationships between various industrial assets.

20 Claims, 17 Drawing Sheets

(51) Int. Cl.
  H04L 29/08 (2006.01)
  G06F 3/0482 (2013.01)
  G06F 3/0484 (2013.01)
  G06F 3/0488 (2013.01)
  H04L 12/24 (2006.01)
  H04L 12/26 (2006.01)
  G06Q 10/04 (2012.01)
  G06Q 10/06 (2012.01)

(52) U.S. Cl.
  CPC ...... *G06F 3/04845* (2013.01); *G06F 3/04847* (2013.01); *G06F 3/04883* (2013.01); *G06Q 10/04* (2013.01); *G06Q 10/06* (2013.01); *H04L 41/12* (2013.01); *H04L 43/045* (2013.01); *H04L 63/0823* (2013.01); *H04L 63/0876* (2013.01); *H04L 63/10* (2013.01); *H04L 63/18* (2013.01); *H04L 67/10* (2013.01); *G05B 2219/23005* (2013.01); *G05B 2219/33139* (2013.01); *G06F 2203/04806* (2013.01)

(58) Field of Classification Search
  CPC ......... H04L 67/10; H04L 63/18; H04L 63/10; G06Q 10/06; G06Q 10/04; G06F 3/04842; G06F 3/04845; G06F 3/04847; G06F 3/04883; G06F 3/0482; G06F 2203/04806
  See application file for complete search history.

(56) References Cited

U.S. PATENT DOCUMENTS

| | | | |
|---|---|---|---|
| 8,972,484 B2 | 3/2015 | Naphade et al. | |
| 9,513,648 B2* | 12/2016 | Forbes, Jr. | G05B 19/02 |
| 9,614,963 B2* | 4/2017 | Maturana | H04M 3/5233 |
| 2003/0023518 A1* | 1/2003 | Spriggs | G05B 15/02 705/28 |
| 2003/0225707 A1* | 12/2003 | Ehrman | G06Q 10/08 705/64 |
| 2005/0258241 A1* | 11/2005 | McNutt | G06Q 90/00 235/385 |
| 2006/0010032 A1* | 1/2006 | Eicher | G06Q 10/0635 705/7.28 |
| 2008/0027704 A1 | 1/2008 | Kephart et al. | |
| 2008/0215474 A1* | 9/2008 | Graham | G06Q 10/10 705/37 |
| 2008/0294387 A1 | 11/2008 | Anderson et al. | |
| 2010/0299138 A1* | 11/2010 | Kim | G06F 17/2705 704/9 |
| 2012/0296482 A1* | 11/2012 | Steven | G06Q 50/06 700/291 |
| 2013/0211559 A1 | 8/2013 | Lawson et al. | |
| 2014/0039699 A1* | 2/2014 | Forbes, Jr. | G05B 19/02 700/286 |
| 2014/0047532 A1 | 2/2014 | Sowatskey | |
| 2014/0303935 A1 | 10/2014 | Kamel et al. | |
| 2014/0337429 A1 | 11/2014 | Asenjo et al. | |
| 2015/0120359 A1 | 4/2015 | Dongieux | |
| 2015/0134733 A1 | 5/2015 | Maturana et al. | |
| 2015/0149134 A1 | 5/2015 | Mehta et al. | |
| 2015/0281453 A1 | 10/2015 | Maturana et al. | |
| 2016/0013948 A1 | 1/2016 | Moses | |
| 2016/0269999 A1* | 9/2016 | Hwang | G01D 21/00 |

OTHER PUBLICATIONS

Hardt, D., "The OAuth 2.0 Authorization Framework", [Online]. Retrieved from the Internet: <URL: https://tools.ietf.org/html/rfc6749, (Oct. 2012), 152 pgs.

Pandit, Puneel, "Scaling machine data analytics for the Internet of Things—introducing Glassbar SCALAR", [online]. (c) 2016 Glassbeam, Inc., [Retrieved on Jan. 14, 2016]. Retrieved from the Internet: <URL: http://www.glassbeam.com/scaling-machine-data-analytics-for-the-internet-of-things-introducing-glassbeam-scalar/ >, (Oct. 21, 2013), 2 pgs.

"A cloud purpose-built for industrial big data and analytics", GE, 2015.

WO International Search Report & Written Opinion dated Feb. 22, 2017 issued for application No. PCT/US2016/069111.

* cited by examiner

SYSTEMS AND METHODS FOR MANAGING INDUSTRIAL ASSETS

CLAIM OF PRIORITY

This patent application claims the benefit of priority to U.S. Provisional Patent Application No. 62/273,782, filed on Dec. 31, 2015, which is incorporated by reference herein in its entirety.

TECHNICAL FIELD

The present application relates generally to the technical field of managing distributed industrial assets.

BACKGROUND

Software-implemented processes have a direct influence over many aspects of society. Digital consumer companies are disrupting the old guard and changing the way we live and do business in fundamental ways. For example, various companies have disrupted traditional business models for taxis, hotels, and car rentals, by leveraging software-implemented processes and interfaces to create new business models that better address consumers' needs and wants.

An Internet of Things (IoT) has developed over at least the last decade, representing a network of physical objects or "things" with embedded software that enables connectivity with other similar or dissimilar things. In some examples, connected things can exchange information, or can receive remote instructions or updates, for example via the Internet. Such connectivity can be used to augment a device's efficiency or efficacy, among other benefits.

Similarly to the way that consumer device connectivity is changing consumers' lifestyles, embedded software and connectivity among industrial assets presents an opportunity for businesses to alter and enhance operations, for example in fields of manufacturing, energy, agriculture, or transportation, among others. This connectivity among industrial assets is sometimes referred to as the Industrial Internet of Things (IIoT).

BRIEF DESCRIPTION OF THE DRAWINGS

Some embodiments are illustrated by way of example and not limitation in the figures of the accompanying drawings.

DETAILED DESCRIPTION

Figure 1:
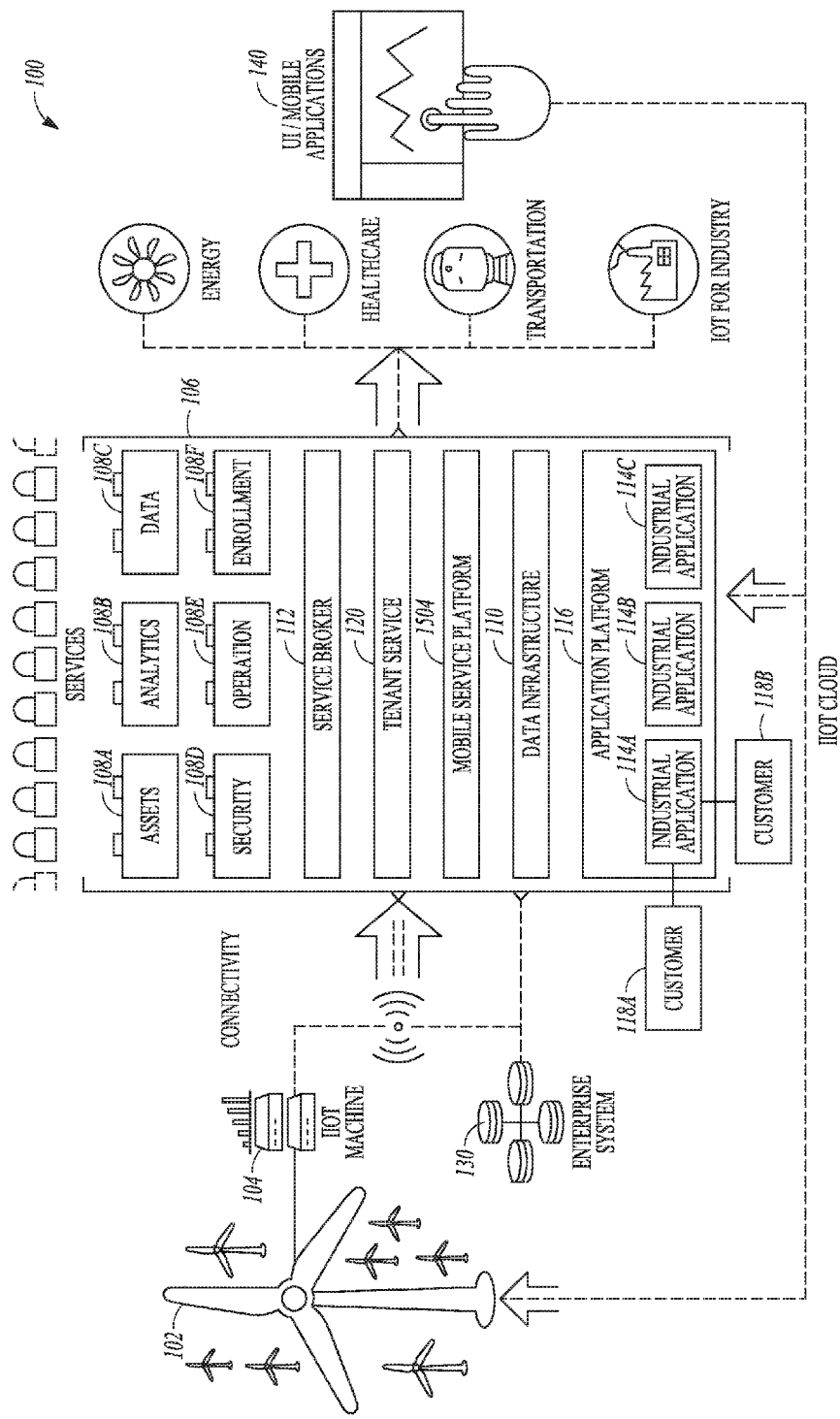
FIG. 1 is a block diagram illustrating an Industrial Internet of Things (IIoT) system, in accordance with an example embodiment.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Until now, Industrial Internet applications have existed substantially in siloed, one-off implementations. There are several flaws with this approach. For example, a siloed approach limits opportunities to create economies of scale, and fails to unlock the potential of connecting multiple machines and data around the globe.

To realize the potential of an Industrial Internet of Things (IIoT), businesses and governments will need to address a number of important obstacles. One includes data security and privacy in the face of cyber-attacks, espionage and data breaches driven by increased connectivity and data sharing. Cyber-security has generally focused on a limited number of end points. However, in the IIoT, such measures will not be adequate in the large scale combination of physical and virtual goods. Organizations will require new security frameworks to address their physical and virtual assets, such as at device, system, and enterprise levels. Each asset or other entry point into the IIoT can pose a security vulnerability if a sufficient framework is unavailable.

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often takes into account both the physics of the task at hand, as well as the environment in which such assets are configured to operate.

Low-level software and hardware-based controllers have long been used to drive industrial assets. However, with the rise of inexpensive cloud computing, increasing sensor capabilities, and decreasing sensor costs, as well as the proliferation of mobile technologies, there are new opportunities to enhance the business value of some industrial assets.

While progress with industrial equipment automation has been made over the last several decades, and assets have become 'smarter,' the intelligence of any individual asset pales in comparison to intelligence and insights that can be gained when multiple smart devices are connected together. Aggregating data collected from or about multiple assets can enable users to improve business processes, for example by improving effectiveness of asset maintenance or improving operational performance.

In an example embodiment, an industrial asset can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications can be constructed, and new physics-based analytics can be created. Insights gained through analysis of such data can lead to enhanced asset designs, or to enhanced software algorithms for operating the same or similar asset at its edge, that is, at the extremes of its expected or available operating conditions.

In an example embodiment, an industrial asset improvement loop can be provided. The improvement loop can include receiving data about one or more assets, such as collected from one or more assets or from sensors appurtenant to the one or more assets. The improvement loop can further include analyzing the collected data locally or at a cloud-based or other remote computing system. Based on the analysis of the data, one or more asset updates can be identified. In an example embodiment, an asset update can include a maintenance schedule change, an operating parameter change, or other update based on the analyzed data. The improvement loop can include updating the same one or more assets corresponding to the analyzed data, or can include updating other assets. That is, updates can optionally be pushed to different assets, such as to assets of the same or similar type to the assets from which the analyzed data was originally received, to yield improvements across multiple assets of the same or similar type.

In an example embodiment, the improvement loop includes further collecting data after an update is implemented, such as to monitor one or more effects of the update. In an example embodiment, the improvement loop includes monitoring assets that received the update and monitoring one or more assets that did not receive the update. Using information from such monitoring over time, a continuous improvement loop can drive productivity in the form of predictive asset maintenance, improved operational performance, or fleet management, among other ways.

Systems and methods described herein are configured for managing industrial assets. In an example embodiment, information about industrial assets and their use conditions, such as gathered from sensors embedded at or near industrial assets themselves, can be aggregated, analyzed, and processed in software residing locally or remotely from the assets. In an example embodiment, applications configured to operate at a local or remote processor can be provided to optimize an industrial asset for operation in a business context. In an example embodiment, a development platform can be provided to enable end-users to develop their own applications for interfacing with and optimizing industrial assets and relationships between various industrial assets and the cloud. Such end-user-developed applications can operate at a device, fleet, enterprise, or global level by leveraging cloud or distributed computing resources.

The systems and methods for managing industrial assets can include or can be a portion of an Industrial Internet of Things (IIoT). In an example embodiment, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets.

In an example embodiment, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, asset analytics (e.g., analytics about the asset itself or about data acquired by an asset), data storage, security, or some other function, as further described herein.

In an example embodiment, a manufacturer of industrial assets can be uniquely situated to leverage its understanding of industrial assets themselves to create new value for industrial customers through asset insights. For example, a manufacturer can leverage existing models of such assets, and industrial operations or applications of such assets, to provide that value. In an example embodiment, an asset management platform (AMP), or IIoT system, can incorporate a manufacturer's asset knowledge with a set of development tools and best practices that enables asset users or customers to bridge gaps between software and operations to enhance capabilities, foster innovation, and ultimately provide economic value.

In an example embodiment, an IIoT system includes a device gateway that is configured to connect multiple industrial assets to a cloud computing system. The device gateway can connect assets of a particular type, source, or vintage, or the device gateway can connect assets of multiple different types, sources, or vintages. In an example embodiment, the multiple connected assets can belong to different asset communities (e.g., notional groups of assets that are assigned by the end user and/or by the IIoT system), and the asset communities can be located remotely or locally to one another. The multiple connected assets can be in use (or non-use) under similar or dissimilar environmental conditions, or can have one or more other common or distinguishing characteristics. In an example embodiment, information about environmental or operating conditions of an asset or an asset community can be shared with the AMP. Using the AMP, operational models of one or more assets can be improved and subsequently leveraged to optimize assets in the same community or in a different community.

Some of the technical challenges involved in an Industrial Internet of Things include items such as predictive maintenance, where industrial assets can be serviced prior to problems developing to reduce unplanned downtimes. One technical challenge involves prediction of when industrial assets or parts thereof will fail. In an example embodiment, an IIoT can monitor data collected from device-based sensors and, using physics-based analytics, detect potential error conditions based on an asset model (i.e., a model corresponding to the device). The asset in question can then be taken off-line or shut down for maintenance at an appropriate time. In addition to these types of edge applications (applications involving the industrial assets directly), the IIoT can pass sensor data to a cloud environment where operational data for similar machines under management can be stored and analyzed. Over time, data scientists can identify patterns or develop improved physics-based analytical models corresponding to the various machines. Updated analytical models can be pushed back to one or more of the assets that the models represent, and performance of the one or more assets can be correspondingly improved.

FIG. 1 is a block diagram illustrating an IIoT system 100, in accordance with an example embodiment. An industrial asset 102, such as a wind turbine as depicted in FIG. 1, may be directly connected to a device such as an IIoT machine 104. The IIoT machine 104 can be a device, machine, software stack embedded into a hardware device, an industrial control system, or a network gateway, among other things. In an example embodiment, the software stack can include its own software development kit (SDK). The SDK can include functions that enable developers to leverage various core features, such as described below. In the example embodiment of FIG. 1, the industrial asset 102 is a member of an asset community, and the IIoT machine 104 can be coupled to one or more members of an asset community.

One responsibility of the IIoT machine 104 can be to provide secure, bi-directional cloud connectivity to, and management of, industrial assets, while also enabling applications (e.g., analytical or operational services applications) at the edge of the IIoT. In an example embodiment, near-real-time processing can be delivered by the IIoT machine 104 in some IIoT environments. A IIoT cloud 106, to which the IIoT machine 104 connects, includes various modules and application services as described below.

The IIoT machine 104 can provide security, authentication, and governance services for endpoint devices and assets such as the industrial asset 102. This arrangement, with the IIoT machine 104 between an asset and the IIoT cloud 106, allows security profiles to be audited and managed centrally across devices, ensuring that assets are connected, controlled, and managed in a safe and secure manner, and that critical data is protected. In an example embodiment, the IIoT machine 104 can support gateway solutions that connect multiple edge components via various industry standard protocols, such as to meet various requirements for industrial connectivity.

In an example embodiment, the IIoT machine 104 includes a software layer configured for communication with one or more industrial assets and the IIoT cloud 106. In an example embodiment, the IIoT machine 104 can be configured to run an application locally at an asset, such as at the industrial asset 102. The IIoT machine 104 can be configured for use with or installed on gateways, industrial controllers, sensors, and other components. In an example embodiment, the IIoT machine 104 includes a hardware circuit with a processor that is configured to execute software instructions to receive information about an asset, optionally process or apply the received information, and then selectively transmit the same or different information to the IIoT cloud 106.

In an example embodiment, the IIoT system 100 can be configured to aid in optimizing operations or preparing or executing predictive maintenance for industrial assets. The system can leverage multiple platform components to predict problem conditions and conduct preventative maintenance, thereby reducing unplanned downtimes. In an example embodiment, the IIoT machine 104 is configured to receive or monitor data collected from one or more asset sensors and, using physics-based analytics (e.g., finite element analysis or some other technique selected in accordance with the asset being analyzed), detect error conditions based on a model of the corresponding asset. In an example embodiment, a processor circuit applies analytics or algorithms at the IIoT machine 104 or at the IIoT cloud 106. In an example embodiment, the IIoT cloud 106 can include an asset cloud computing system, such as can be coupled to multiple different machines, assets, or other devices, including virtual assets. In response to a detected error condition, the IIoT system 100 can issue various mitigating commands to the asset, such as via the IIoT machine 104, for manual or automatic implementation at the asset. In an example embodiment, the IIoT system 100 can provide a shut-down command to the asset in response to a detected error condition. Shutting down an asset before an error condition becomes fatal can help to mitigate potential losses or to reduce damage to the asset or its surroundings.

In an example embodiment, the IIoT cloud 106 includes an asset module 108A, analytics module 108B, data module 108C, security module 108D, operations module 108E, and enrollment module 108F, as well as data infrastructure 110. This allows other computing devices, such as client computers running user interfaces/mobile applications to perform various analyses of either the individual industrial asset 102 or multiple assets of the same type. Each of the modules 108A-108F includes or uses a dedicated circuit, or instructions for operating a general purpose processor circuit, to perform the respective functions. In an example embodiment, the modules 108A-108F are communicatively coupled in the IIoT cloud 106 such that information from one module can be shared with another. In an example embodiment, the modules 108A-108F are co-located at a designated datacenter or other facility, or the modules 108A-108F can be distributed across multiple different locations.

FIG. 1 includes an interface device 140 that can be configured for data communication with one or more of the IIoT machine 104 or IIoT cloud 106. The interface device 140 can be used to monitor or control one or more assets or machines that are coupled to the IIoT cloud 106. In an example embodiment, information about the industrial asset 102 is presented to an operator at the interface device 140. The information about the industrial asset 102 can include information from the IIoT machine 104, or the information can include information from the IIoT cloud 106. In an example embodiment, the information from the IoT cloud 106 includes information about the industrial asset 102 in the context of multiple other similar or dissimilar assets (e.g., co-located assets or assets that are not co-located), and the interface device 140 can include options for optimizing one or more members of an asset community to which the industrial asset 102 belongs, such as based on analytics performed at the IIoT cloud 106 or performed locally by the IIoT machine 104.

In an example embodiment, an operator selects a parameter update for the industrial asset 102 (e.g., a first wind turbine) using the interface device 140, and the parameter update is pushed to the industrial asset 102 via one or more of the IIoT cloud 106, the IIoT machine 104, or using some other communication gateway. In an example embodiment, the interface device 140 is in data communication with an enterprise computing system 130 and the interface device 140 provides an operation with enterprise-wide data about the industrial asset 102 in the context of other business or process data. For example, choices with respect to asset optimization can be presented to an operator in the context of available or forecasted raw material supplies or fuel costs.

In an example embodiment, choices with respect to asset optimization can be presented to an operator, such as using the interface device 140, in the context of a process flow to identify how efficiency gains or losses at one asset impacts other assets. In an example embodiment, one or more choices described herein as being presented to a user or operator can alternatively be made automatically by a processor circuit according to earlier-specified or programmed operational parameters. In an example embodiment, such a processor circuit can be located at one or more of the interface device 140, the IIoT cloud 106, the enterprise computing system 130, or elsewhere.

In an example embodiment, an operator selects a parameter update for the industrial asset 102 using the interface device 140, and the parameter update is pushed to the asset via one or more of the IIoT cloud 106 and IIoT machine 104. In an example embodiment, the interface device 140 is in data communication with the enterprise computing system 130 and the interface device 140 provides an operation with enterprise-wide data about the industrial asset 102 in the context of other business or process data. For example, choices with respect to asset optimization can be presented to an operator in the context of available or forecasted raw material supplies or fuel costs. In an example embodiment, choices with respect to asset optimization can be presented to an operator in the context of a process flow to identify how efficiency gains or losses at one asset can impact other assets.

Services or applications provided by the IIoT cloud 106 and generally available to applications designed by developers can include application-based asset services from asset module 108A, analytics services from analytics module 108B, data services from data module 108C, application security services from security module 108D, operational services from operations module 108E, and enrollment services from enrollment module 108F.

Asset services, such as provided by the asset module 108A, can include applications configured to create, import, and organize asset models or associated business rules.

Analytics services, such as provided by the analytics module 108B, can include applications to create, catalog, orchestrate, or perform analytics that can serve as a basis for applications to create insights about industrial assets.

Data services, such as provided by the data module 108C, can include applications to ingest, clean, merge, or store data using an appropriate storage technology, for example, to make data available to applications in a way most suitable to their use case. In an example embodiment, information from the industrial asset 102, such as data about the asset itself, can be communicated from the asset to the data module 108C. In an example embodiment, an external sensor can be used to sense information about a function of an asset, or to sense information about an environment condition at or near the industrial asset 102. The external sensor can be configured for data communication with a gateway and the data module 108C, and the IIoT cloud 106 can be configured to use the sensor information in its analysis of one or more assets, such as using the analytics module 108B.

In an example embodiment, the IIoT cloud 106 can store or retrieve operational data for multiple similar assets using the data module 108C. Over time, data scientists or machine learning can identify patterns and, based on the patterns, can create improved physics-based analytical models for identifying or mitigating issues at a particular asset or asset type. The improved analytics can be pushed back to all or a subset of the assets, such as via one or multiple IIoT machines 104, to effectively and efficiently improve performance of designated (e.g., similarly-situated) assets.

The data module 108C can be leveraged by developers to bring data into the IIoT cloud 106 and to make such data available for various applications, such as applications that execute at the IIoT cloud 106, at a machine module such as the IIoT machine 104, or at an asset (e.g., one of the industrial machines 200) or other location. In an example embodiment, the data module 108C can be configured to cleanse, merge, or map data before ultimately storing it in an appropriate data store, for example, at the IIoT cloud 106. In an example embodiment, the data module 108C is configured to receive, manage, and archive time series data, as it is the data format that most sensors use.

Application security services, such as provided by the security module 108D, can include applications to meet end-to-end security requirements, including those related to authentication and authorization. In an example embodiment, application security services include an authorization service application that can be used to assess device or user credential data and selectively grant access to other services.

Security can be a concern for data services that deal in data exchange between the IIoT cloud 106 and one or more machines, assets or other components. Some options for securing data transmissions include using Virtual Private Networks (VPN) or an SSL/TLS model. In an example embodiment, the IIoT system 100 can support two-way TLS, such as between the IIoT machine 104 and the security module 108D. In an example embodiment, two-way TLS may not be supported, and the security module 108D can treat client devices as OAuth users. For example, the security module 108D can allow enrollment of an asset (or other device) as an OAuth client and transparently use OAuth access tokens to send data to protected endpoints.

Operational service applications, such as provided by the operations module 108E, can enable application developers to manage the lifecycle or commercialization of their applications. Operational services can include development operational services, which can be applications to develop or deploy Industrial Internet applications in the IIoT cloud 106, as well as business operational applications, which can be applications that enable transparency into the usage of Industrial Internet applications so that developers can enhance profitability.

In an example embodiment, the operations module 108E can include services that developers can use to build or test Industrial Internet applications, or can include services to implement Industrial Internet applications, such as in coordination with one or more other IIoT system modules. In an example embodiment, the operations module 108E includes a microservices marketplace where developers can publish their services and/or retrieve services from third parties. The operations module 108E can include a development framework for communicating with various available services or modules. The development framework can offer developers a consistent look and feel and a contextual user experience in web or mobile applications. Examples of various development modules are discussed below at FIGS. 8-12.

Enrollment service applications, such as provided by the enrollment module 108F, can be used to enroll or commission machines or devices for use with one or more other devices or applications available in or via the IIoT cloud 106.

In an example embodiment, the IIoT system 100 can further include a connectivity module. The connectivity module can optionally be used where a direct connection to the IIoT cloud 106 is unavailable. For example, a connectivity module can be used to enable data communication between one or more assets and the cloud using a virtual network of wired (e.g., fixed-line electrical, optical, or other) or wireless (e.g., cellular, satellite, or other) communication channels. In an example embodiment, a connectivity module forms at least a portion of a gateway between the IIoT machine 104 and the IIoT cloud 106.

In an example embodiment, the IIoT cloud 106 can coordinate various modules to enhance asset value or function. For example, the IIoT system 100 can use the IIoT cloud 106 to retrieve an operational model for the industrial asset 102 from the asset module 108A. The model can be stored in the cloud system, at the IIoT machine 104, or elsewhere. The IIoT cloud 106 can use the analytics module 108B to apply information received about the industrial asset 102 or its operating conditions to or with the retrieved operational model. In an example embodiment, the information about the asset or its operating conditions can be received from the data module 108C. Using a result from the analytics module 108B, the operational model can optionally be updated, such as for subsequent use in optimizing the industrial asset 102 or one or more other assets, such as one or more assets in the same or different asset community. For example, information about a first wind turbine can be analyzed at the IIoT cloud 106 to inform selection of an operating parameter for a remotely located second wind turbine that belongs to a different second asset community.

In an example embodiment, an asset model provides a centerpiece of one or more Industrial Internet applications. While assets are the physical manifestations of various asset types (i.e., types of industrial equipment, such as turbines), an asset model can include a digital representation of the asset's structure. In an example embodiment, an asset service provides Application Program Interfaces (APIs), such as Representational State Transfer (REST) APIs that enable application developers to create and store asset models that define asset properties, as well as relationships between assets and other modeled elements. Application developers can leverage the service to store asset-instance data. For example, an application developer can create an asset model that describes a logical component structure of all turbines in a wind farm and then create instances of that model to represent each individual turbine. Developers can also create custom model objects to meet their own unique domain needs.

In an example embodiment, the asset module 108A may include an API layer, a query engine, or a graph database. The API layer acts to translate data received from an asset for storage and query in the graph database. The query engine enables developers to use a standardized language, such as Graph Expression Language (GEL), to retrieve data about any object or property of any object in the asset service data store, and the graph database stores the data.

An asset model can represent information that application developers store about assets, and can include information about how one or more assets are configured or organized, or how they are related. Application developers can use the asset module 108A APIs to define a consistent asset model and optionally a hierarchical structure for the data. Each piece of physical equipment, or asset, may then be represented by an asset instance. Assets can be organized by classification and by any number of custom modeling objects. For example, an organization can use a location object to store data about where its pumps are manufactured, and then use a manufacturer object to store data about specific pump suppliers. It can also use classifications of pumps to define pump types, to assign multiple attributes, such as a material type, to each classification, and to associate data from various meters or other values to a classification.

Data service applications from the data module 108C enable Industrial Internet application developers to bring data into the system and make it available for their applications. Data can be received or acquired via an ingestion pipeline that allows for data to be cleansed, merged with data from other data sources, and stored in an appropriate type of data store, whether it be a time series data store for sensor data, a Binary Large Object (BLOB) store for medical images, or a relational database management system (RDBMS).

Since many of the assets are industrial in nature, much of the data that enters the IIoT system 100 for analysis is sensor data from industrial assets. In an example embodiment, a time series service may provide a query efficient columnar storage format optimized for time series data. As a continuous stream of information flows in from various sensors for analysis, such as based on time, an arrival time of each stream can be maintained and indexed in this storage format for more efficient queries. The time series service can also provide an ability to efficiently ingest massive amounts of data based on extensible data models. The time series service capabilities address operational challenges posed by the volume, velocity, and variety of IIoT data, such as efficient storage of time series data, indexing of data for quick retrieval, high availability, horizontal scalability, and data point precision.

In an example embodiment, application security service applications can be provided by the security module 108D, such as including user account and authentication (UAA) and access controls. The UAA service provides a mechanism for applications to authenticate users or devices by setting up a UAA zone. An application developer can bind an application to the UAA service and then use services such as basic login and logout support for an application, such as without needing to recode such services for each application. Access control can be provided as a policy-driven authorization service that can enable applications to create access restrictions to resources based on various criteria.

Thus, a situation arises where application developers wishing to create industrial applications for use in the IIoT system 100 may wish to use common services that many such industrial applications may use, such as a log-in page, time series management, data storage, and the like. A developer can use such services, for example, by instantiating different instances of the services and having respective applications consume those instances. Multiple services may be instantiated in this way.

In an example embodiment, applications or functions of the IIoT cloud 106 can be multi-tenant. Multi-tenant applications permit different customers of an application to "share" the application (e.g., in the cloud environment), such as while maintaining their respective data privately from each other (i.e., in "isolation"). In such circumstances, an application may instantiate different instances of each of multiple services used by an application for the different customers. This arrangement can be time consuming and resource intensive, for example, because each instance is instantiated separately and then bound to the application. Instantiations and bindings can be performed using a service broker 112. Various Industrial Applications 114A-114C, such as can be executed at the IIoT cloud 106, can be hosted by application platform 116. Customers 118A-118B can interact with applications 114A-114C to which they have subscribed. In the example of FIG. 1, customers 118A and 118B subscribe to, or are tenants of, application 114A. A tenant service 120 may be used to manage tenant-related modifications, such as management of templates and creation of tenants.

Figure 2:
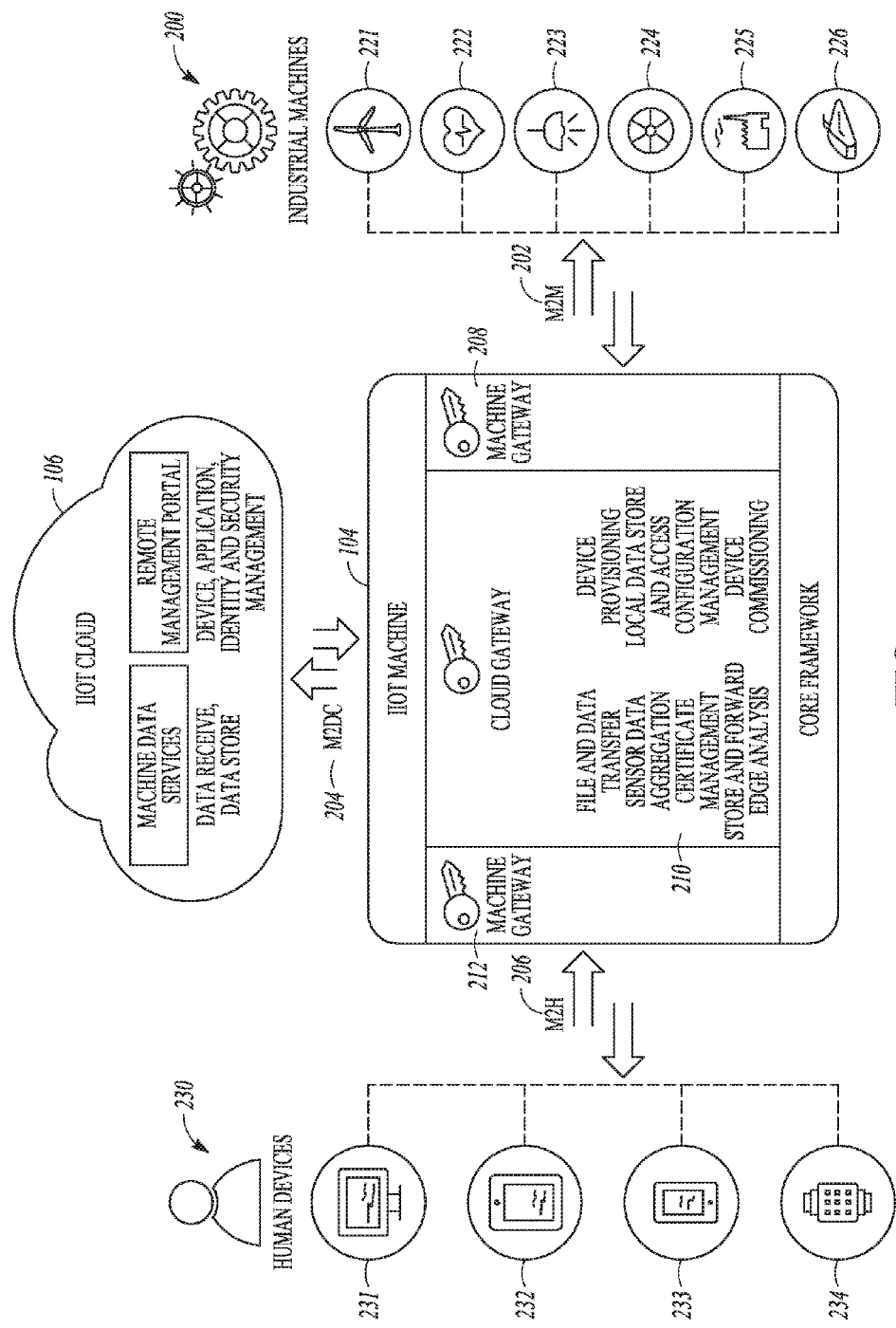
FIG. 2 is a block diagram illustrating edge connectivity options for an IIoT machine, in accordance with an example embodiment.

FIG. 2 is a block diagram illustrating edge connectivity options for the IIoT machine 104, in accordance with an example embodiment. There are generally three types of edge connectivity options that an IIoT machine 104 provides, including a machine gateway (M2M) 202, a cloud gateway (M2DC) 204, and a mobile gateway (M2H) 206. The IIoT machine 104 can be deployed in various different ways. For example, the IIoT machine 104 can be deployed on a gateway, on controllers, or on sensor nodes. The gateway can act as a smart conduit between the IIoT cloud 106 and one or more industrial machines 200.

While many Industrial Internet applications may reside in the IIoT cloud 106, such applications can be configured to connect to the various assets and process data at the assets. The IIoT machine 104 can be configured to provide various functions to gather sensor data, process such data locally, and then push it to the IIoT cloud 106. The IIoT cloud 106 enables the IIoT by providing a scalable cloud infrastructure that serves as a basis for platform-as-a-service (PaaS), which is what developers can use to create Industrial Internet applications for use in the IIoT cloud 106. Users can also create applications to operate in the IIoT cloud 106. While the applications reside in the IIoT cloud 106, they can rely partially on a local IIoT machine 104 to provide various capabilities, such as to gather sensor data, to process data locally, or to push data to the IIoT cloud 106.

The example of FIG. 2 includes a representation of a virtual network that enables fast, secure connectivity between various industrial assets or machines (such as can be geographically distributed) and the IIoT cloud 106. That is, the IIoT machine 104 can be configured to provide secure, bi-directional connectivity between the IIoT cloud 106 and one or more industrial machines 200. The IIoT machine 104 can further be configured to enable various analytical or operational applications or services to operate at the edge of the Industrial Internet. In this manner, the IIoT machine 104 can facilitate near-real-time control of industrial assets based on services provided at or in coordination with the IIoT cloud 106.

In an example embodiment, the IIoT machine 104 is configured to provide security, authentication, and governance services for endpoint devices or assets, that is, for the industrial machines 200. Security profiles applied by the IIoT machine 104 can be audited and managed centrally for multiple devices that can be coupled to the IIoT machine 104. This arrangement can ensure that the assets are connected, controlled, and managed in a safe and secure manner and that critical data is protected. In an example embodiment, the IIoT machine 104 is configured to negotiate a secure connection with the IIoT cloud 106 using the security module 108D.

The IIoT machine 104 can be coupled with one or more industrial machines 200. In the example of FIG. 2, the industrial machines 200 include energy assets 221 (e.g., power generation systems, etc.), healthcare assets 222 (e.g., imaging systems, patient record management systems, patient sensor or treatment devices, etc.), illumination assets 223 (e.g., illumination devices or systems, etc.), various mechanical assets 224, manufacturing or automation assets 225 (e.g., robots, etc.), or transportation assets 226 (e.g., locomotives, jet engines, control systems, etc.), among others.

The various industrial machines 200 can be coupled with the IIoT machine 104 via one or more wired or wireless communication protocols, such as over the M2M gateway 202. Many assets or machines can support connectivity through industrial protocols such as Open Platform Communication (OPC)-UA or ModBus. A machine gateway component 208 may provide an extensible plug-in framework that enables connectivity to assets via the M2M gateway 202 based on these common industrial protocols or using other protocols. In an example embodiment, the protocols provide an extensible plug-in framework that enables out-of-the-box connectivity to new assets based on the most common industrial platforms.

The IIoT machine 104 can be coupled with various interface devices 230 via one or more wired or wireless communication protocols, such as over the M2H gateway 206. In an example embodiment, the interface devices 230 include or use the interface device 140. The interface devices 230 can include, among other things, an asset-based computer terminal 231 that is integrated with or adjacent to an asset, a tablet computer 232, a mobile device 233 such as a smart phone or other multi-function electronic device, or a wearable device 234, such as a smart watch. In an example embodiment, sensor data from one or more of the industrial machines 200 is received at an application provided at the IIoT machine 104. The application can be configured to analyze, cleanse, act on, or otherwise process the received sensor data. In an example embodiment, the application can be configured to securely transfer the sensor data to the IIoT cloud 106 for further analysis, processing, or distribution. The processed or raw data can be presented to a user via the interface devices 230, or the interface devices 230 can be configured to receive further inputs for analysis at the IIoT machine 104 or the IIoT cloud 106.

In an example embodiment, in addition to connecting the industrial machines 200 to the IIoT cloud 106, the protocols used by the M2H gateway 206 can represent a mobile gateway that enables users to bypass the IIoT cloud 106 and establish a direct connection to one or more of the industrial machines 200. This capability can be useful in, among other things, maintenance scenarios. For example, when a service technician is deployed to maintain or repair a machine, the technician can connect directly to the machine to receive information about its particular operating conditions or to perform troubleshooting.

In an example embodiment, a cloud gateway component 210 connects the IIoT machine 104 to the IIoT cloud 106 via the M2DC gateway 204. In an example embodiment, the IIoT machine 104 can be coupled with the IIoT cloud 106 using a cloud communication protocol, such as can include HTTPS, WebSockets, or some other protocol. The cloud communication protocol can include HTTPS, WebSockets, or other protocol. In an example embodiment, the IIoT machine 104 acts as a cloud gateway module that can perform various functions on machine data (e.g., including sensor data gathered from or about a machine), or can parse data communicated between or among the IIoT cloud 106, the industrial machines 200, and the interface devices 230.

In an example embodiment, the IIoT machine 104 includes a file and data transfer circuit that is configured to receive files or data from one or more of the industrial machines 200. The file and data transfer module can process, package, batch, reformat, or address the received files or data such as for exchange or communication with the interfaces devices 230 or the IIoT cloud 106.

In an example embodiment, the IIoT machine 104 includes a sensor data aggregation circuit or database. The data aggregation circuit or database can be configured to receive sensor data from one or more of the industrial machines 200, or to receive information from one of the interface devices 230. In an example embodiment, the data aggregation circuit or database parses the received data and maintains a selected portion of the received data for analysis, storage, or transmission. The sensor data aggregation circuit or database can connect to multiple sensors (e.g., at the same or multiple different assets) and then can push an aggregated data fingerprint to the IIoT cloud 106. The aggregated data fingerprint can be representative of the received data from the multiple sensors and can include indications of particularly noteworthy asset events (e.g., overheating conditions, characteristics after extended operation durations, operations data corresponding to extreme environmental conditions, etc.).

In an example embodiment, one or both of the IIoT machine 104 and the security module 108D include security certificate management circuits. A certificate management circuit can be configured to manage security certificates or other communication verification procedures, such as from the IIoT machine 104 to or from any one or more of the IIoT cloud 106, the interface devices 230, or the industrial machines 200. In an example embodiment, the IIoT system 100 supports SSL-based data connections between the IIoT machine 104 and the IIoT cloud 106.

In an example embodiment, the IIoT machine 104 includes a store and forward circuit. The store and forward circuit can be configured to store sensor data received from one or more of the industrial machines 200. In an example embodiment, the store and forward circuit can be configured to store commands received from, or outputs provided to, the interface devices 230. In an example embodiment, the store and forward circuit provides an intermediate database or memory circuit between and accessible by the industrial machines 200 and the IIoT cloud 106, for example, by collating data from the industrial machines 200 over time and, when a specified threshold amount of data is acquired, then transmitting the collated data (or some specified portion of the collated data) to the IIoT cloud 106. In an example embodiment, the store and forward circuit can be used when continuous communication between the IIoT machine 104 and the IIoT cloud 106 is unavailable or unreliable, for example, when a locomotive (e.g., the industrial machine in this example) travels through a tunnel. The IIoT machine 104 can detect when communication with the IIoT cloud 106 is available or interrupted and can responsively enable or disable the store and forward circuit.

In an example embodiment, the IIoT machine 104 includes an edge analysis module, such as comprising hardware (e.g., one or more processor circuits) and software to carry out machine-based analyses. Industrial scale data can be voluminous and generated continuously, and may not always be efficiently transferred to the IIoT cloud 106 for processing. The edge analysis module can provide pre-processing for received data from one or more of the industrial machines 200 such that only a pertinent portion of the received data is ultimately retained or sent to the IIoT cloud 106.

In an example embodiment, the edge analysis module includes a processor circuit that is configured to execute data analysis algorithms using data received from the industrial machines 200 and, optionally, using algorithms or other inputs received from the IIoT cloud 106 or from the interface devices 230. In an example embodiment, the edge analysis module is configured to retrieve an algorithm from the IIoT cloud 106 for performance locally at the IIoT machine 104 using data from one or more of the industrial machines 200.

In an example embodiment, the IIoT machine 104 includes a device provisioning or commissioning module. The device provisioning module can be configured to identify (e.g., automatically upon connection) a new or changed industrial asset among multiple available industrial machines 200. The device provisioning module can optionally communicate information about the new or changed asset to the IIoT cloud 106, such as to register the asset or to receive configuration information for the asset. In an example embodiment, the device provisioning module can push software updates or other changes from the IIoT cloud 106 to a detected new or changed asset.

In an example embodiment, the IIoT machine 104 includes a local data store and access module. The local data store and access module can include a database or memory circuit that is located at the IIoT machine 104 and that stores asset data, for example, for use by a local service technician.

In an example embodiment, the IIoT machine 104 includes a configuration management module. The configuration management module can be configured to allow remote configuration of the IIoT machine 104 or one or more of the industrial machines 200. In an example embodiment, the configuration management module tracks configuration changes over time to provide a record of changes at an asset. In an example embodiment, the configuration management module shares information about an asset configuration with the IIoT cloud 106.

In an example embodiment, the IIoT machine 104 includes a device decommissioning module. In an example embodiment, the device decommissioning module can be configured to notify the IIoT cloud 106 when a particular asset or machine is taken offline or is no longer to be under the influence of the IIoT cloud 106.

As described above, there are a series of core capabilities provided by the IIoT system 100. Industrial scale data, which can be massive and is often generated continuously, cannot always be efficiently transferred to the cloud for processing, unlike data from consumer devices. Edge analysis, such as performed by the IIoT machine 104 and/or by the industrial machines 200 themselves, can provide a way to preprocess data so that only specified or pertinent data is sent to the IIoT cloud 106. Various core capabilities can include file and data transfer, store and forward, local data store and access, sensor data aggregation, edge analysis, certificate management, device provisioning, device decommissioning, and configuration management.

Figure 3:
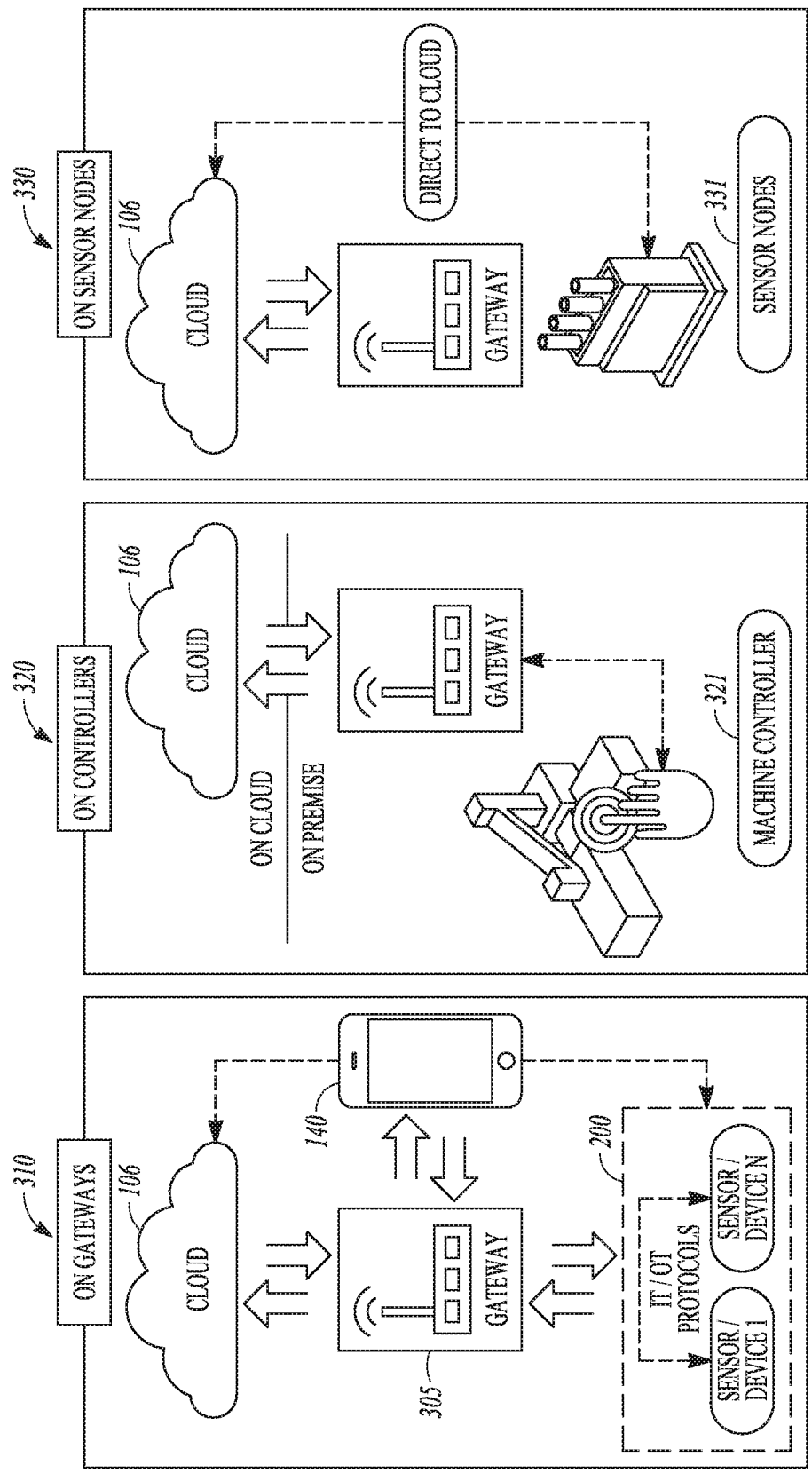
FIG. 3 is a block diagram illustrating examples of deployments of an IIoT machine.

FIG. 3 is a block diagram illustrating examples of deployments of an IIoT machine. FIG. 3 includes a first example embodiment 310 with the IIoT machine 104 deployed on a gateway, a second example embodiment 320 with the IIoT machine 104 deployed on a machine controller, and a third example embodiment 330 with the IIoT machine 104 deployed at a sensor node.

In the first example embodiment 310, a gateway 305 can be configured to act as a smart conduit or communication link between the IIoT cloud 106, one or more of the industrial machines 200, and the interface device 140. In this example embodiment, the respective industrial machines 200 are represented by the blocks "Sensor/Device 1" and "Sensor/Device n". Various software components of the IIoT machine 104 can be deployed (i.e., executed) using one or more processors on the gateway 305 to provide connectivity to assets via a variety of IT or OT protocols, including HMI devices running IOS, Android or other mobile operating systems.

In the second example embodiment 320, the IIoT machine 104 can be configured to be deployed on an asset controller 321 (e.g., at or corresponding to one or more of the industrial machines 200). In this configuration, machine software can be decoupled from machine hardware, such as to facilitate connectivity, upgradability, cross-compatibility, remote access, and remote control. It can also enable industrial and commercial assets that have traditionally operated stand-alone or in isolated networks to be connected directly to the IIoT cloud 106, such as for data collection or substantially real-time analytics.

In the third example embodiment 330, the IIoT machine can be deployed on sensor nodes 331. In this scenario, intelligence can reside in the IIoT cloud 106, and simple, low-cost sensors can be deployed on or near the various assets or machines (e.g., at individual ones of the industrial machines 200), such as at the asset 102. The sensors nodes 331 can be configured to receive or collect machine data or environment data and then provide the data to the IIoT cloud 106 (e.g., directly or through an IIoT gateway). Once the data reaches the IIoT cloud 106, the data can be stored, analyzed, visualized, or otherwise processed.

Figure 4:
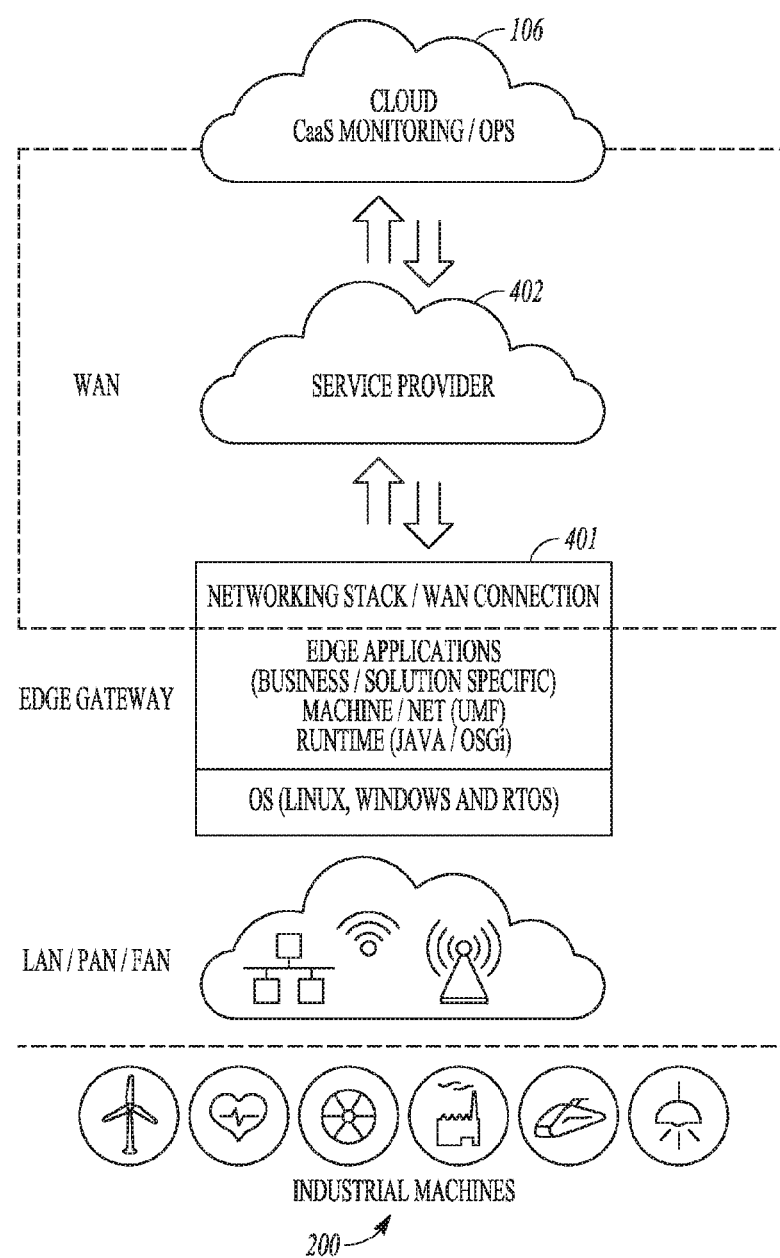
FIG. 4 illustrates generally an example embodiment showing connectivity between industrial machines and an IIoT cloud.

FIG. 4 illustrates generally an example embodiment showing connectivity between the industrial machines 200 and the IIoT cloud 106. In the example of FIG. 4, one or more of the industrial machines 200 can be coupled to a networking stack 401 or wide-area network (WAN) by way of any one or more networks. The one or more of the industrial machines 200 can be coupled to the networking stack 401 using cellular, fixed-line, satellite, or other wired or wireless communication channels. The networking stack 401 can be considered to be at an edge of the IIoT cloud 106.

The networking stack 401 can communicate with the IIoT cloud 106, such as via a third party service provider 402 (e.g., an Internet service provider). Under the architecture of the example embodiment of FIG. 4, a global virtual network can be provided that fulfills Internet requirements in a repeatable manner that can be substantially transparent to an enterprise.

Figure 5:
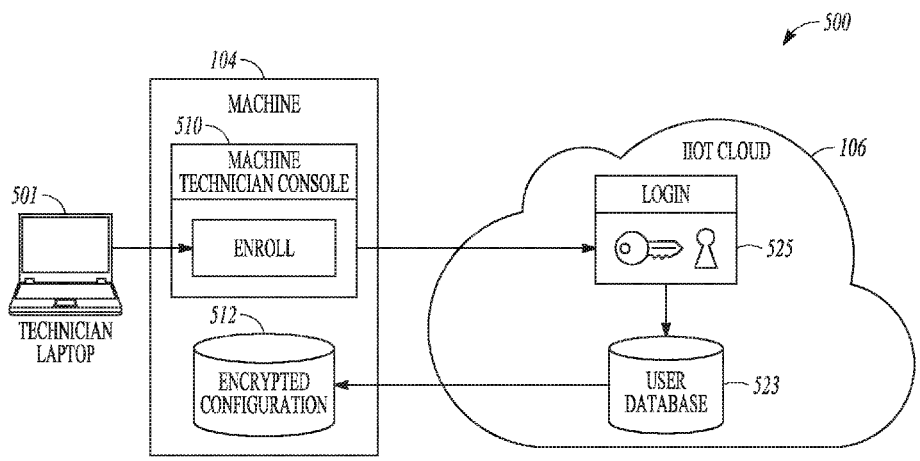
FIG. 5 is a block diagram illustrating several participants in a machine enrollment process, in accordance with an example embodiment.

FIG. 5 is a block diagram illustrating several participants in a machine enrollment process, in accordance with an example embodiment. A device or machine can be required to register to enroll with one or more service applications in the IIoT cloud 106, such as to access the services or applications on a temporary or ongoing basis. The block diagram of FIG. 5 includes the IIoT machine 104 and the IIoT cloud 106. At the beginning of an enrollment process, the IIoT cloud 106 can optionally have no prior knowledge of a device or devices to be commissioned. In an example embodiment, an enrollment service application provided at the IIoT cloud 106 can permit a technician to create or register a device identity without requiring device-specific credential data. That is, the IIoT machine 104 or other device can register or enroll with the IIoT cloud 106 even if the machine or device is not previously authorized or known to a service at the IIoT cloud 106.

In the example embodiment of FIG. 5, a technician laptop 501 is used to contact an enrollment portal 510 associated with the IIoT machine 104, which in turn can contact a login portal 525 at the IIoT cloud 106 with a device enrollment request. In an example embodiment, technician credential data (e.g., credential data associated with a particular human technician or user) are used to negotiate device enrollment. The login portal 525 negotiates login credential data, such as associated with a human technician, and other user information using a user database 523. If the technician credential data are accepted, then one or more tokens can be sent from the IIoT cloud 106 to the IIoT machine 104. Optionally, the one or more tokens are encrypted and maintained at the IIoT machine 104 such as in a repository 512. The tokens can then be used by the IIoT machine 104 to establish data communication paths between the IIoT machine 104 and one or more services or applications at the IIoT cloud 106.

In the example embodiment of FIG. 5, the enrollment portal 510 includes a web console that operates on the IIoT machine 104. The web console can require valid credential data to operate, and a technician can log in to the web console using valid technician credential data. Optionally, the technician encounters an "Enroll" object, or similar interface object, that can be selected to initiate an enrollment or commissioning process. In response to the technician's selection of the interface object, the IIoT machine 104 can contact the IIoT cloud 106. In an example embodiment, the technician enters the same or different credential data to log in to an enrollment service application at the IIoT cloud 106. In an example embodiment, technician credential data accepted at the enrollment portal 510 of the IIoT machine 104 can grant temporary authorization to the IIoT machine 104 to communicate with the enrollment service application at the IIoT cloud 106. For example, the IIoT machine 104 can obtain an authorization code from the IIoT cloud 106 that enables, such as for a specified duration, communication between the IIoT machine 104 and one or more designated services at the IIoT cloud 106.

At the IIoT cloud 106, and in response to receiving the technician credential data, the enrollment service application at the IIoT cloud 106 can prepare a new account for the IIoT machine 104. The enrollment service application can return various information to the IIoT machine 104, such as tokens, scopes, or other information that can be stored at the IIoT machine 104 in one or more secure, encrypted files. In an example embodiment, once the IIoT machine 104 is enrolled with the IIoT cloud 106, the IIoT machine 104 can automatically obtain access tokens using the encrypted information. The access tokens can be included in any subsequent request sent to the IIoT cloud 106.

In order to process the vast amounts of data generated by IIoT scenarios or implementations, cloud computing can be a preferred choice. Previously, enterprise application developers provisioned or over-provisioned, high-end, expensive hardware capable of scaling-up to handle a highest-envisioned load at the time of design. This was expensive and difficult as developers would have to add capacity if greater scale was later required. The present inventors have recognized that cloud computing resolves these and other issues by leveraging commercial, or off-the-shelf, hardware. For example, in a cloud-based computing environment, it can be relatively easy to scale operations out, such as by adding additional computers or processors, instead of scaling up, such as by adding more storage, memory, or processing capacity to an existing server. Cloud computing, such as using the IIoT cloud 106, thus solves some challenges, but developers are still faced with a significant amount of work to manage scalability at the application layer. PaaS solutions can provide developers the tools that developers need to create scalable applications that are native to the cloud. In an example embodiment, a central administrator of the IIoT cloud 106 can manage the complexity of scale so that developers can focus on creating applications that drive industrial value, to thereby bring cloud computing into the currently under-connected industrial world both reliably and inexpensively.

In an example embodiment, the IIoT cloud 106 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources, such as processor priority or access time, can be performed at a granular level, thus allowing optimal resource allocation.

In an example embodiment, the IIoT cloud 106 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the CF ecosystem and an ever-growing library of CF services. Additionally, because it is open source, CF can be customized for IIoT workloads at the IIoT cloud 106.

Figure 6:
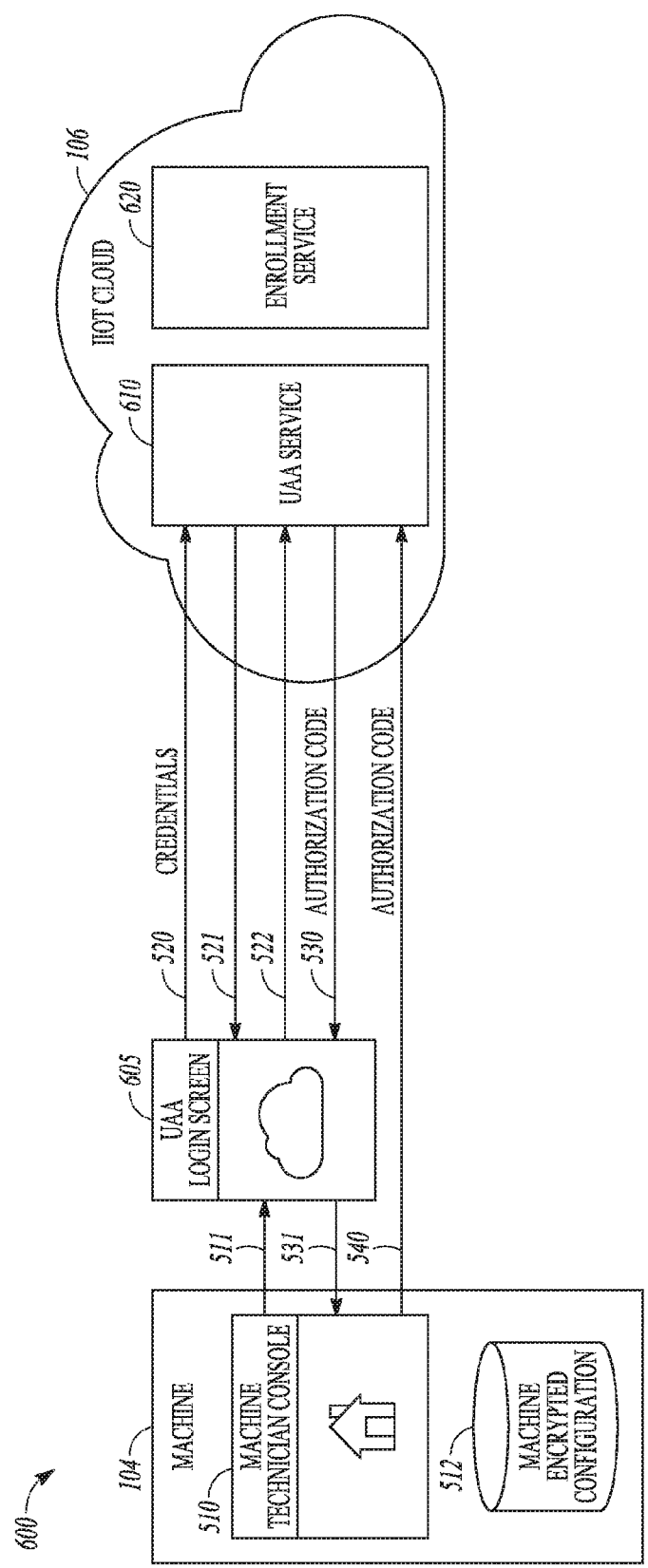
FIG. 6 is a block diagram illustrating device and cloud components used in an enrollment process, in accordance with an example embodiment.
Figure 7:
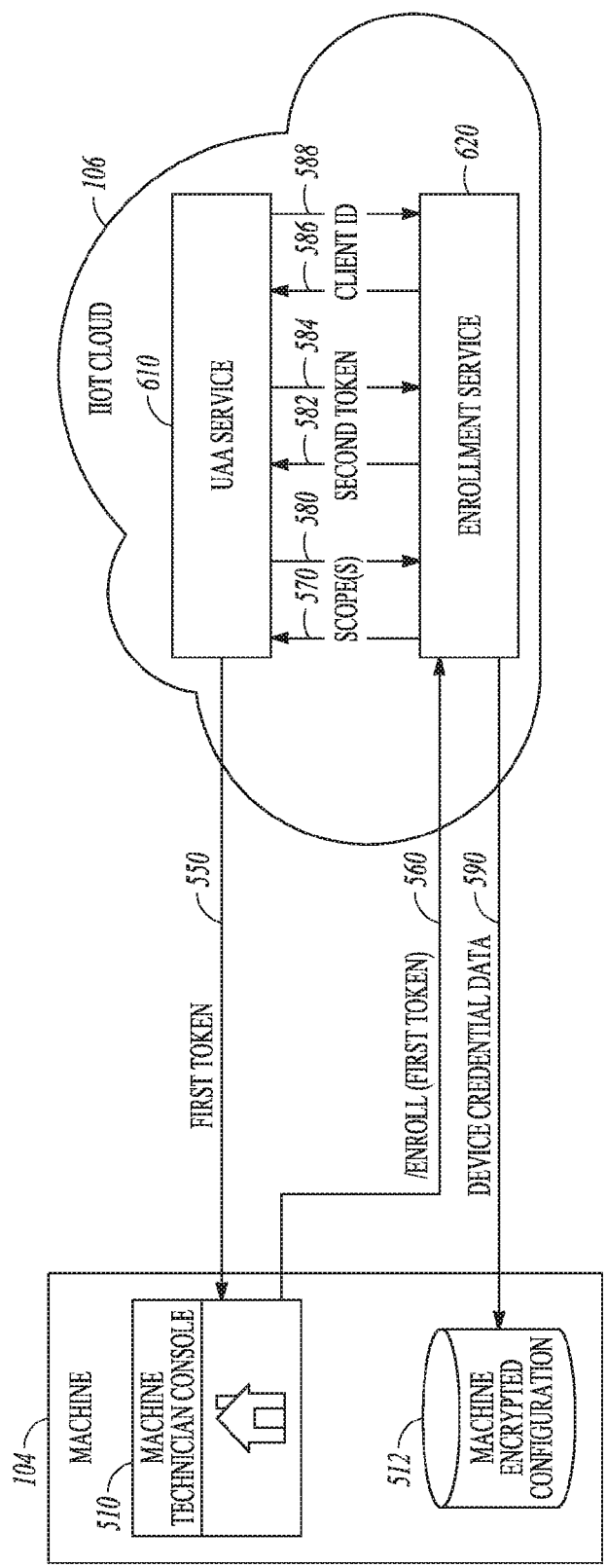
FIG. 7 is a block diagram illustrating device and cloud components used in an enrollment process, in accordance with an example embodiment.

FIGS. 6 and 7 are block diagrams illustrating device and cloud components used in an enrollment process. The figures illustrate the IIoT machine 104 and the IIoT cloud 106. The IIoT machine 104 includes a technician console or enrollment portal 510 and the repository 512 for encrypted configuration information associated with the machine. The IIoT cloud 106 includes a UAA service 610 (e.g., provided at least in part by the security module 108D) and an enrollment service application 620 (e.g., provided at least in part by the enrollment module 108F). A UAA interface 605 or login screen is illustrated to indicate the portal between the IIoT machine 104 and the UAA service 610.

In an example embodiment, the device interface is a hardware interface or terminal that is associated with the IIoT machine 104. In an example embodiment, the device interface includes a data communication link between the IIoT machine 104 and one or more external devices, such as a technician computer, laptop, tablet, or other device that can be coupled directly or indirectly (e.g., via the Internet or an intranet) to the IIoT machine 104.

In the example of FIG. 6 and FIG. 7, various operations or processes are illustrated by arrows that depict, e.g., an information flow. For example, operation 511 corresponds to providing or receiving technician credential data at the UAA interface 605. The UAA interface 605 can be instantiated at the IIoT machine 104, at a technician device, or at some other device that can facilitate or negotiate a login procedure. In an example embodiment, at operation 511, a technician can click on an "Enroll" button in a device console. In response to the technician's selection, a browser window can pop up and connect the technician with an /oauth/authorize endpoint in the associated UAA instance.

At operation 520, the method 500 includes providing credential data to an authorization server or an authorization service application, such as the UAA service 610. For example, technician credential data received at the UAA interface 605 can be provided to the UAA service 610 at the IIoT cloud 106. In an example embodiment, a request can be made to an/oauth/authorize endpoint at the UAA service 610. The/oauth/authorize request can require a login, so the UAA service 610 can redirect the IIoT machine 104 to a UAA login screen, for example, at operation 521 of FIG. 6. At operation 522, the technician can enter credential data at the UAA interface 605 and can be authenticated with the UAA service 610.

At operation 530, a device-specific authorization code can be returned to the IIoT machine 104 from an authorization service application, such as from the UAA service 610. The device-specific authorization code can be specified for a particular machine having a particular identification or serial number, or the device-specific authorization code can be specified for a particular class or type of machine.

In an example embodiment, a device authorization code can be sent from the UAA service 610 to the IIoT machine 104. The device-specific authorization code can then be used by the IIoT machine 104 to obtain an access token for use with the enrollment service application. At operation 530, the UAA service 610 can return an authorization code to the IIoT machine 104, for example, together with a redirect address to use to continue the enrollment process. In an example embodiment, at operation 531 of FIG. 6, the redirect address (e.g., URL) points to a RESTful endpoint hosted at the enrollment portal 510 (e.g., at a web console associated with the IIoT machine 104).

At operation 540, a device-specific authorization code can be provided to an authorization service application, such as the UAA service 610, from the IIoT machine 104. Providing the device-specific authorization code can include providing an explicit request for an access token from the authorization service application, or providing the authorization code can be interpreted by the authorization service application as a request for an access token. In an example embodiment, the endpoint hosted at the enrollment portal 510 can submit, to the UAA service 610, a request for an OAuth2 access token using the received device-specific authorization code.

Referring now to FIG. 7, at operation 550, the example embodiment includes receiving a first access token at the IIoT machine 104 from an authorization service application, such as the UAA service 610. For example, if the authorization code and credential data submitted by the IIoT machine 104 (e.g., at 540) are accepted by the UAA service 610, then a first access token can be returned to the IIoT machine 104.

At operation 560, the example embodiment includes using the IIoT machine 104 to provide the first access token to an authorization service application, such as the UAA service 610. In an example embodiment, the IIoT machine 104 provides the first access token to the enrollment service application 620 together with an enrollment request. In an example embodiment, the IIoT machine 104 sends a POST request to an/enroll endpoint at the enrollment service application 620 with the access token (e.g., from operation 550) included in an authorization header. The authorization header can optionally include a device identifier corresponding to the IIoT machine 104.

At operation 570, the example embodiment includes providing a subsequent access token from the enrollment service application 620 to an authorization service application, such as the UAA service 610. In an example embodiment, the enrollment service application 620 receives the first access token at operation 560, and then at operation 570, the enrollment service application 620 sends the same first access token to the UAA service 610. The enrollment service application 620 can optionally update header or other information associated with the first access token before it sends the token to the UAA service 610. The UAA service 610 performs a validation routine to determine whether the received token is valid. If the token is valid, then the method 500 continues at operation 580.

At operation 580, the example embodiment includes receiving, at the enrollment service application 620 and from an authorization service application, such as the UAA service 610, one or more scopes associated with the first access token. In an example embodiment, the UAA service 610 maintains or accesses various scopes that can be associated with tokens. The scopes can define whether a particular machine or device connected to the UAA service 610 or to the IIoT cloud 106 is permitted access to a specified other service, module, data, or other feature available in or via the IIoT cloud 106. In an example embodiment, in response to the UAA service 610 receiving the first token at 570, the UAA service 610 returns to the enrollment service application 620 (or to another designated location or service) a list of valid scopes corresponding to the first token.

At operation 582, the example embodiment includes using the enrollment service application 620 to request a second access token from an authorization service application, such as the UAA service 610. The enrollment service application 620 can analyze one or more of the scopes received at operation 580. If the scope(s) are valid, then the enrollment service application 620 requests the second access token from the UAA service 610. In an example embodiment, the enrollment service application 620 requests the second access token using a client credentials grant type under an OAuth2 framework. At operation 584, the example embodiment includes receiving a second access token at the enrollment service application 620 from an authorization service application, such as the UAA service 610.

At operation 586, the example embodiment includes providing the second access token to the enrollment service application, such as together with device credential data corresponding to the IIoT machine 104, to enroll a device. In an example embodiment, the enrollment service application 620 provides the second access token (e.g., the token received at operation 584) to the UAA service 610 with a client or device identifier. The client or device identifier can be particular to the IIoT machine 104, or particular to a specified group or type of devices.

In an example embodiment, the enrollment service application 620 further provides a random password or secret to the UAA service 610, such as together with the second access token. In an example embodiment, the enrollment service application 620 performs operation 586 using a POST request to an/oauth/clients endpoint at the UAA service 610. At operation 588, the example embodiment includes receiving the client or device identifier at the enrollment service application 620 from an authorization service application, such as from the UAA service 610, when the enrollment succeeds. In an example embodiment, operation 588 includes receiving an additional or alternative indication, at the enrollment service application 620, that the enrollment was successful.

At operation 590, the example embodiment includes providing credential data to the IIoT machine 104. In an example embodiment, the enrollment service application 620 transmits one or more of the client or device identifier, a password or secret, a token, or other data for use by the IIoT machine 104 in a subsequent authentication or access procedure, such as with the IIoT cloud 106 or with one of the cloud's services or modules. In an example embodiment, the IIoT machine 104 encrypts and stores the received credential data in a configuration file, such as in the repository 512.

In an example embodiment, after the enrollment procedure is completed, the IIoT machine 104 retains credential data in its repository 512. The IIoT machine 104 uses the credential data for subsequent access to one or more cloud services via the IIoT cloud 106 while the credential data remain valid. In an example embodiment, the IIoT machine 104 provides the credential data (e.g., including a client identification code and a client secret or password) to the UAA service 610 with a request for access to a specified service and, if the UAA service 610 determines that the request and credential data are valid, then the UAA service 610 can issue a token to the IIoT machine 104 for subsequent access to the specified service. In an example embodiment, the IIoT machine 104 engages the one or more cloud services directly, and the services contact the UAA service 610 for authorization.

In an example embodiment, device credential data can expire. Additionally or alternative, devices can be required to update their credentials occasionally to maintain security and system integrity. In an example embodiment, updated device credential data, such as including a new machine identifier or secret, can be issued from the enrollment service application 620 and/or from the UAA service 610 to enrolled devices. Credential updates can occur at timed intervals, after some specified number of logins or access events, or at some other time as specified by a user or programmer.

The UAA service 610, as a central authority that administers or defines access to cloud services, can be configured to manage relationships or access between the IIoT cloud 106, its services, and one or more machines or devices. For example, the UAA service 610 can be used as a central control authority that can revoke or meter access to one or more cloud services based on a particular machine or device identity. If access is revoked for a machine, then the machine can be required to re-enroll with the UAA service 610, such as following the procedure described in FIGS. 6 and 7. In an example, revoked or suspended access can be changed by a technician with authority to update access parameters directly from the UAA service 610.

In an example embodiment, the UAA service 610 provides machine or device access to various services or to other machines based on one or more scopes associated with a machine. In an example embodiment, the UAA service 610 administers access to one or more services from machines of a specified machine type or class, or a specified group of machines, such as based on a scope that is common to the machines.

Enrollment with a cloud server can be achieved using the systems and methods described above. In an alternative or supplementary example embodiment, a machine or device can enroll with a cloud server without the assistance of or credential data related to a technician. Generally, to enroll or authenticate, a device will have to prove its identity using some element that is previously known to an authenticator, that is, to a server or service that provides authentication or validates enrollment.

In the case of a human user looking to authenticate himself or herself with a service, passwords (i.e., unique character strings) are generally used because a password cannot be easily extracted or derived from a human without the human's cooperation. In a device context, a password would have to persist somewhere on or in association with the device. The security of the device's password, therefore, depends upon security measures that are put in place on the device itself, such as physical accessibility measures or encryption.

Certificate-based authentication provides several qualities that are suitable for device-based authentication schemes. Certificates can be difficult to forge, and devices can be capable of securely storing certificates, e.g., in an encrypted repository. Furthermore, there is a substantial preexisting infrastructure to support certificates, for example in the PKI environment. Various features such as certificate issuance, trust, and revocation can be exploited from preexisting PKI tools.

Figure 8:
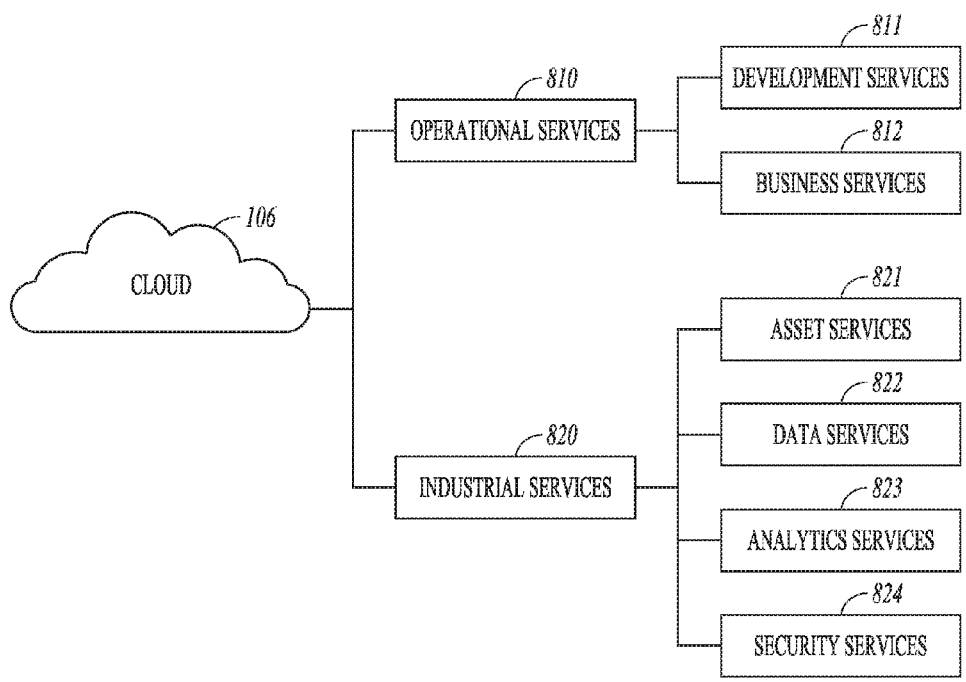
FIG. 8 is a block diagram illustrating operational services and industrial services in an IIoT system, in accordance with an example embodiment.

FIG. 8 is a block diagram illustrating operational services and industrial services in an IIoT system, in accordance with an example embodiment. In the example embodiment of FIG. 8, the IIoT cloud 106 can be divided into two categories or service areas including operational services 810 and industrial services 820. The operational services 810 include development services 811 and business services 812. The industrial services 820 include asset services 821, data services 822, analytics services 823, and security services 824.

Operational services 810 are configured to enable application developers to manage the lifecycle and commercialization of their applications, for example, through development services 811 that are configured for development and deployment of Industrial Internet applications in the cloud, and through business services 812 that enable transparency into the usage of Industrial Internet applications, for example, so that developers can design for profitability.

The development services 811 can provide developers with tools to create and run Industrial Internet applications in the IIoT cloud 106. In an example embodiment, the development services 811 include tools to facilitate building, testing, and deploying new tools.

One fundamental change brought about by cloud computing is how software is delivered. Traditionally, software has been shipped to a customer for installation, e.g., behind a firewall. With cloud computing, software is no longer shipped, but rather deployed and operated on behalf of the customer, who accesses it over the Internet. This change in delivery model results in changes to the software development lifecycle model, ultimately combining development and operations.

In an example embodiment, the development services 811 include various features for facilitating automation. Tools for source control management, agile planning, automated build and deploy, or testing can be helpful for efficiently moving code through the pipeline from development to production.

In an example embodiment, the development services 811 include source control management (SCM). For example, a hosted SCM system can be made available for storing application source code. Developers can move existing project code or create a new project by using portions of example applications already on the platform.

In an example embodiment, the development services 811 includes a continuous delivery (CD) pipeline that can be configured to automate software builds, tests, and deployments. The CD pipeline can be configured to ensure predictability from the beginning of the development cycle through production delivery. It checks that build processes are working, and enables rapid and repeatable provisioning of new environments. With these CD tools, application developers can create a pipeline with automated build, test, and deploy capabilities to shorten the time-to-value for customers.

The business services 812 include various features that help providers add value for customers. Traditional software vendors and their customers can suffer due to 'shelfware' (software that is purchased, but never used). The shelfware cost to customers is that customers may pay for something that provides no value. The cost to vendors is also real as customer turnover rates increase. Without understanding true usage or value of a software product, a business may not be able to determine where to allocate development resources for future product enhancements. With cloud computing such as using the IIoT cloud 106, however, a software provider can be also the software operator, and can instrument its code to better understand the usage of the software itself. That is, the software provider can embed various code features that ultimately help the software operator (in this case, the same entity as the software provider) to identify which portion(s) of the software are most often used and in what manner.

In an example embodiment, the business services 812 include a web-based monetization solution that enables continuous business model innovation for industrial services. By giving product and marketing managers granular control and visibility over how key components are rolled out, tested, and scaled within a particular business model, the business services 812 can provide tools (e.g., product catalog, packaging, pricing and policies) to ensure profitability. Product and marketing teams can iteratively build, split-test, and launch each component to one or more customers and distribution channels. As business models get rolled out and scaled, the product and marketing teams can have visibility into their revenue and cost metrics so they can measure the impact of the changes. Additionally, they gain insight into the best and worst performing products, packages, customer segments, and distribution channels.

Figure 9:
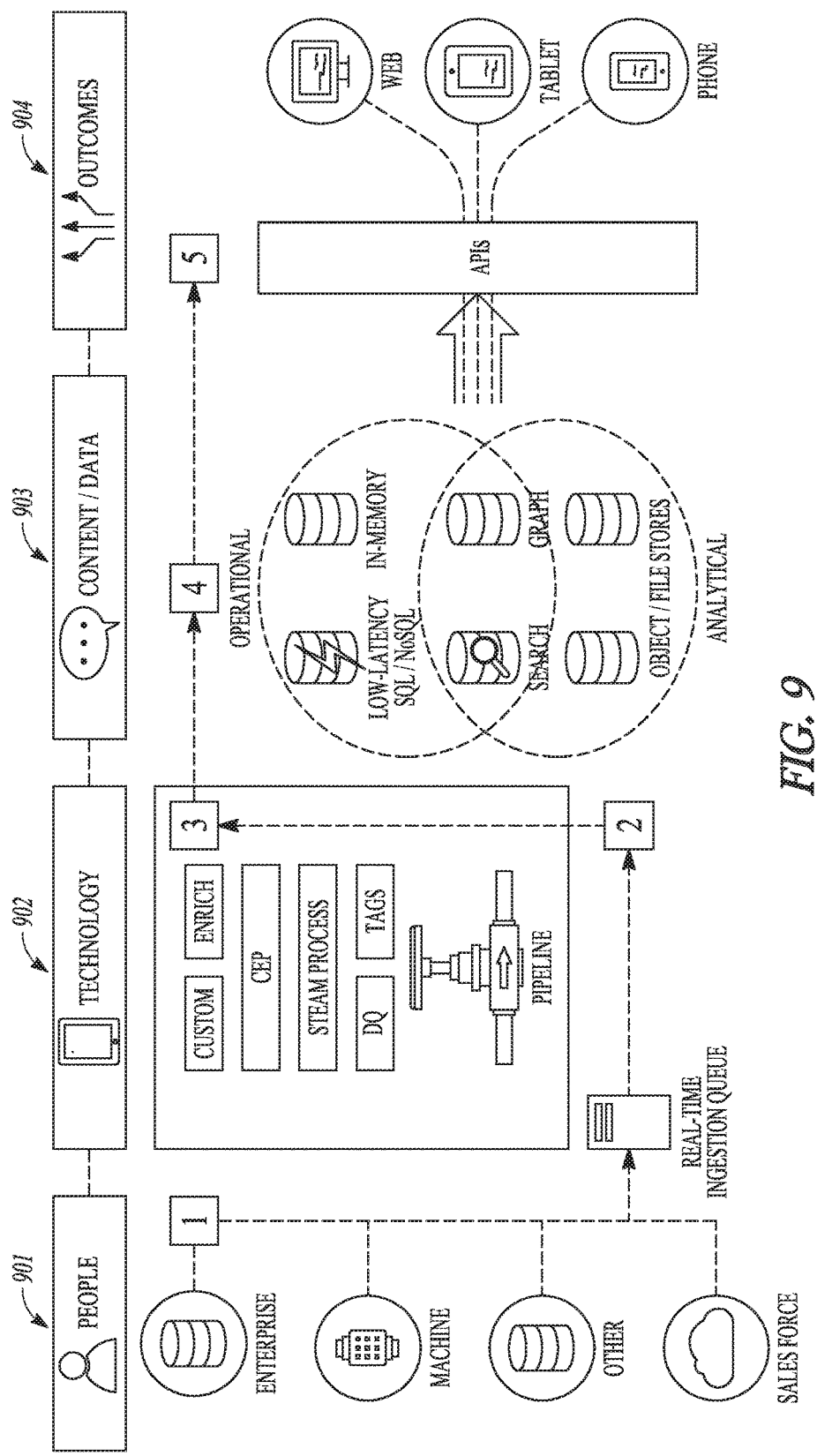
FIG. 9 illustrates generally a process flow for some industrial services, in accordance with an example embodiment.

In the example of FIG. 8, the industrial services 820 refer to multiple different services that can be configured to work together for data acquisition, retention, or deployment. FIG. 9 illustrates generally a process flow for some of the industrial services 820, in accordance with an example embodiment.

The example embodiment of FIG. 9 shows how provisioning of the industrial services 820 encompasses front-end people or objects 901, hardware and software data ingestion objects 902, and one or more data and analytics modules 903, to render various outcomes 904. The front-end people or objects 901 can include, among other things, enterprise-level data stores, machine objects (e.g., including the IIoT machine 104 or one or more of the industrial machines 200), sales teams, engineering teams, and so on. As illustrated in block "1" of FIG. 9, the people or objects 901 can provide data to the IIoT cloud 106 using the various mechanisms and techniques described herein. At block "2", data can be ingested by the IIoT cloud 106, such as substantially in real-time via an ingestion queue. In an example embodiment, the ingestion queue includes or is coupled to the networking stack 401 described above in the example of FIG. 4. The ingestion queue can be a direct feeder or coupling between a source device and IIoT cloud 106 destination, or the ingestion queue can include various processing to cleanse or otherwise gate data entering the IIoT cloud 106.

In an example embodiment, at blocks "2" or "3", the ingestion pipeline can be managed by the hardware and software data ingestion objects 902. In an example embodiment, incoming data via the pipeline can be customized (e.g., formatted or re-formatted), enriched (e.g., with timestamp information), tagged (e.g., with source or destination attribute information), or otherwise processed. After ingestion to the IIoT cloud 106, the industrial services 820 can include or use one or more data and analytics modules 903 to perform various operational and analytical tasks (see, e.g., the discussion below regarding the asset services 821, data services 822, analytic services 823, and security services 824). Following the data management provided by the data and analytics modules 903, the outcomes 904 can include final preparation or presentation of data to users. In an example embodiment, additionally or alternatively to the outcomes 904 including a user presentation, information resulting from analytics performed can be pushed back to the front-end people or objects 901, such as for automatically updating one or more machines or processes.

Referring again to FIG. 8, asset services 821, such as provided using the asset module 108A in the IIoT system 100, can provide the software and/or hardware tools to model, analyze, or simulate various industrial machines and associate such assets with data sources. Asset models can include a digital or virtual representation of a physical structure of one or more industrial machines. The asset services 821 can provide tools to create, store, or query asset models, properties, and the relationships between assets and other modeled elements.

In an example embodiment, an asset model can represent information about how assets are organized or related. A developer can use the asset services 821 to define a consistent or static asset model and a hierarchical structure for data associated with the model, or with multiple instances of the model. In an example embodiment, each asset or physical instance of a machine can be represented by an asset model instance. Assets can be organized by a classification and by any number of custom modeling objects. For example, an organization can use a Location object to store data about where its pumps are manufactured, and then use a Manufacturer object to store data about specific pump suppliers. It can also use several classifications of Pumps to define pump types, assign attributes (e.g., material type) to each classification, and associate multiple meters or sensors (e.g., flow, pressure, etc.) to each classification.

In the example of FIG. 1, an asset model of an industrial turbine, such as corresponding to the industrial asset 102, can define a hierarchy of parts that make up a turbine, for example including the turbine's attendant integrated or nearby sensors. In an example embodiment, the asset model further defines acceptable sensor data ranges. The asset model can be used for processor-implemented simulation of one or more corresponding assets.

In an example embodiment, the asset services 821 includes an API layer, a query engine and a graph database. The API layer can include REST APIs that enable application developers to create and store asset models that define asset properties, relationships between different assets, or other modeling elements. Application developers can leverage the asset services 821 to store asset-instance data. For example, an application developer can create an asset model that describes a logical component structure of multiple turbines at a specified wind farm, and can then create instances of that model to represent each individual turbine. Developers can also create custom modeling objects that meet unique domain or implementation needs.

In the REST API layer, applications can access a domain object modeling layer using REST endpoints that provide a JSON interface to describe their objects. The asset services 821 can be configured to translate data from JSON to Resource Description Framework (RDF) triples for storage and query in the graph database, and then back to JSON again. In an example embodiment, the query engine can enable developers to use Graph Expression Language (GEL) to retrieve data about any object or property of any object in an asset service data store. The graph database can include a data store that stores data as RDF triples.

In an example embodiment, the asset services 821 includes APIs that support assets, classifications, and custom domain modeling objects. Assets can be defined in a hierarchical structure including a parent asset and one or more peers or children. Assets can be associated with a classification or any number of custom modeling objects, and can have any number of user-defined attributes. An asset can also "stand alone" in the IIoT system 100 such that it is not associated with other modeling elements.

Classifications can be arranged in a tree structure and provide a means to group similar assets and track attributes that are common to those assets. Classifications can be associated with an asset, a sensor, or both. In an example embodiment, a classification can point to multiple assets. Attributes can be assigned at any level in the classification hierarchy.

Custom modeling objects can include hierarchies that are used to provide more information about assets. For example, custom modeling objects can be used to indicate asset type, location, manufacturer, or service contract. A location can be associated with multiple assets. Similarly, an individual asset can be associated with multiple locations.

Referring again to FIG. 8, the data services 822 can be provided using the data module 108D. In an example embodiment, the data services 822 receive asset model information, such as from the asset services 821. The data services 822 can cleanse or parse incoming asset data and store it in an appropriate memory circuit location. For example, a time series data store can be used to store operational and historical data for a temperature sensor associated with the industrial asset 102.

The data services 822 can enable developers to bring data into the IIoT system 100 and make it available for various applications. For example, data can be brought in through a data ingestion pipeline configured to cleanse or parse the data, merge incoming data with data from one or more other sources, and ultimately store the data in an appropriate data store, for example, a time series data store for sensor data, a Binary Large Object (BLOB) store for MRI images, or a relational database management system (RDBMS). See, for example, FIG. 9 at blocks 2 and 3.

A binary large object (BLOB) storage service can provide a highly available and horizontally scalable storage service that allows secure storage of byte arrays. It can further provide mechanisms for efficient retrieval to various application containers and tiers. For example, large amounts of data in any file type can be stored or retrieved using the BLOB store.

In an example embodiment, a data ingestion pipeline provided by the data services 822 is the entry point for all data in the IIoT cloud 106. The pipeline can facilitate data entry in multiple ways, including for example HTTP streaming for real-time or near-real-time data, or FTP for batch-style data processing. In an example embodiment, the pipeline provides data processing before the data is stored, such as can enable developers to perform various functions including mapping sensor data to tags, combining asset data with enterprise resource planning (ERP) data (e.g., to assess a financial depreciation of an asset against its performance), or processing complex events. For example, processing at the pipeline can include identifying specified combinations of events to indicate a higher-level business event. In an example embodiment, after the data is processed at the pipeline, a more informed decision can be made as to an appropriate store for the data.

In an example embodiment, data from the pipeline can be stored as time series data. Such an arrangement can provide a query-efficient, columnar storage format that is optimized for time series data. As a continuous stream of information flows from sensors and is available for analysis, an arrival time of each data stream can be maintained and indexed for faster queries. Such a time series format can efficiently ingest large amounts of data based on extensible data models, and can address various operational challenges posed by a volume, velocity, or variety of data, including efficient storage of time series data, indexing the data for quick retrieval, high availability, horizontal scalability, and millisecond-or-less data point precision.

Referring again to FIG. 8, analytics services 823, such as provided by the analytics module 108B, can receive information from the data services 822. In an example embodiment, the analytics services 823 create, catalog, or perform analytics—that is, in an example embodiment, computational analysis or assessment of data from one or more of the industrial machines 200—that facilitate enhanced operating characteristics for one or multiple industrial assets. Analytics can include a function or program (e.g., a processor-implemented, physics-based algorithm) that processes machine data from one or more of the industrial machines 200. Analytics can be used directly by an application or at a step in an orchestration of multiple analytics, such as where an output of one analytic (e.g., an intermediate or final result of some analysis) can be an input for another. The inputs and outputs for each analytic can be expressed as parameters to enable an analytic to be reused for different use cases. Analytics and orchestrations can be organized under a taxonomical (category with subcategory) structure and stored in a catalog. In an example embodiment, analytics can be composed in Java, Matlab, Python, or other language, any of which can be stored at an analytic catalog and executed by a runtime service.

In an example embodiment, the analytics services 823 can enable applications to process asset data and detect trends or develop use-based insights about assets under management. Analytics services 823 could be used, for example, to determine that a turbine's temperature range could be optimized. Under a decision to implement a temperature range change, the analytics services 823 can direct the operational services 810 to push configuration changes to the industrial asset 102 via the IIoT machine 104.

The analytics services 823 can include, among other things, operational and historical analytics, such as can include or use machine learning (e.g., by one or more machines or modules in the IIoT cloud 106). Operational analytics can include data that is analyzed substantially in real-time, such as at the source or asset that generates the data. In an example embodiment, operational analytics can be performed at or for aircraft engines, wind turbines, MRI machines, or other industrial machines. Using operational analytics, error conditions or anomalies can be detected substantially in real-time so that operating changes can be implemented with minimal delay, such as to prevent damage or to optimize performance.

Historical analytics can include collection and analysis of historical operational data. From such data, predictive models for one or more assets can be created or updated. The models can then be applied to enhance efficiencies at the asset, plant, fleet, or enterprise level.

In an example embodiment, the analytics services 823 enable a feedback loop between operational and historical analytics. Operational analytics performed at an edge or extreme of an asset's operating range can ensure maximized or efficient operation of assets, and such analytics can be improved or expanded over time based on historical analytics. For example, operational analytics can include continuously monitoring a temperature of an asset, and initiating a user alert or shutdown in the event of detected unacceptable operating temperatures. However, after collecting a sufficient amount of data, such as over multiple operational intervals or over multiple different assets, it can be determined that a threshold should vary by a physical elevation characteristic of each asset. In such case, a new analytic that takes elevation into account could be created and then be deployed to IIoT machine 104 associated with assets of the same or similar type around the world.

In an example embodiment, an analytic catalog at the IIoT cloud 106 can be accessed through REST APIs and a user interface. In an example embodiment, an analytic validation module can be provided to enable a developer to test an analytic against sample data while preparing it for production.

In an example embodiment, analytics hosted in an analytic catalog can be categorized by taxonomy locations. Such an arrangement can provide a structured method of grouping related analytics and can facilitate analytic retrieval. In an example embodiment, an analytic catalog can be provided with a default taxonomy for predefined analytics, such as analytics provided by an asset manufacturer.

In an example embodiment, a runtime service is configured to support elastic execution of analytics from the analytic catalog, whether individually or as part of an orchestration. The runtime service can be a collection of coordinated microservices that handle the dispatch of analytics or orchestrations based on rules, timers, or events. Each analytic can be executed as a separate microservice. Third party analytics, such as can be deployed from other than the analytics catalog, can also be orchestrated, provided the orchestration execution microservice can interact with them. In an example embodiment, a user can interact with a configuration microservice that allows an orchestration to be defined in Business Process Model and Notation (BPMN) XML, such as including references to analytics in the catalog as well as third-party analytics.

Referring again to FIG. 8, security services 824 can be provided by the security module 108D, such as to perform end-to-end data security among the various data-coupled components in the IIoT system 100. For example, the security services 824 can enable authentication or authorization of one or more machine modules and the IIoT cloud 106 (see, e.g., the discussion of FIGS. 5-7.) In an example embodiment, the security services 824 include user account and authentication (UAA) for applications to authenticate users. An application developer can bind to the UAA service in a marketplace and then use various industry standards, such as SCIM and OAuth, to handle identity management and authentication, respectively. Together, these capabilities can provide basic login and logout support. Additionally, the UAA service can support Security Assertion Markup Language (SAML) to enable users to login using third-party identity providers. For example, users can leverage GE Single Sign On (SSO) to access applications. In an example embodiment, basic UAA features can be extended to include user whitelisting (e.g., to ensure access by a qualified subset of authenticated users to an application) and client-side token validation (e.g., to eliminate extra network round trips and thereby improve performance). After a user is authenticated, an application may then separately control access to its resources.

In an example embodiment, access control services can be provided by applications. Such services can include a policy-driven authorization service that enables applications to create access restrictions to resources based on a number of criteria. In an example embodiment, an access control service can be integrated with a UAA service and can provide a Spring security extension to facilitate Spring Boot applications to make access decisions.

Building applications for an Industrial Internet can have unique requirements that can separate such applications from traditional IT applications. Context drives any user experience, but it can be important to provide the correct information to a particular user at a particular time in industrial applications.

Figure 10:
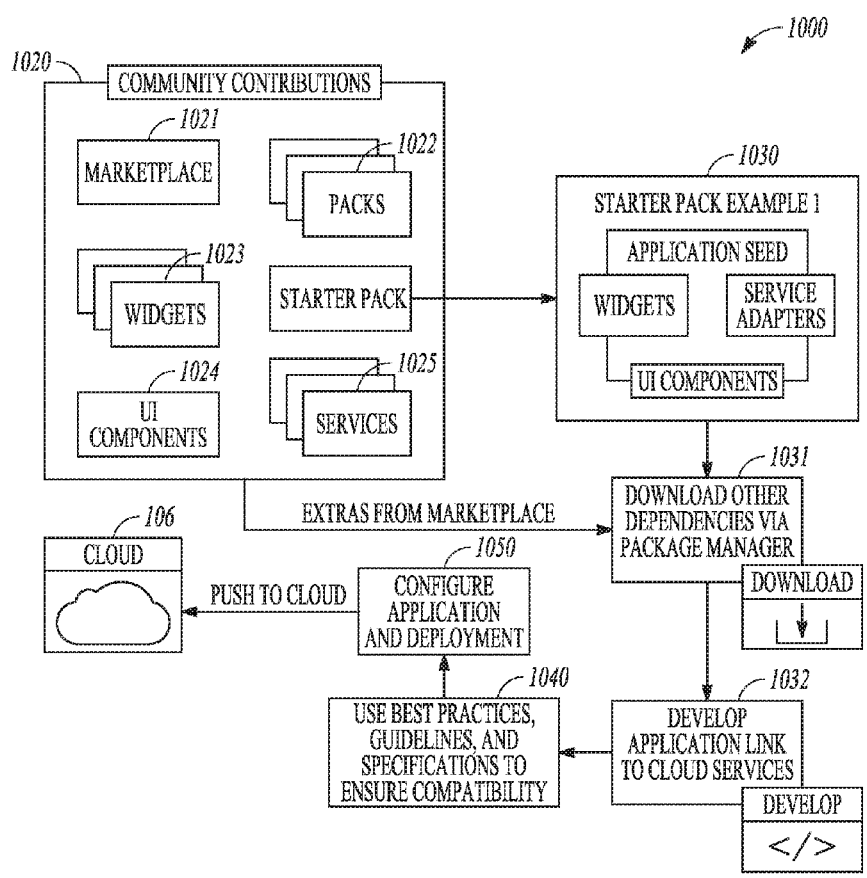
FIG. 10 illustrates an application development cycle for an application to be deployed in an IIoT system, in accordance with an example embodiment.

FIG. 10 illustrates an application development cycle 1000 for an application to be deployed in the IIoT system 100, in accordance with an example embodiment. In the example embodiment of FIG. 10, various development tools can be made available to a developer to facilitate programming of IIoT applications. For example, various community contributions 1020 can be made available, such as using a Dashboard Seed configured to provide a developer with appropriate tooling, skeleton structure, framework, platform capabilities, and test data to facilitate application development deployment at the IIoT cloud 106. In an example, the community contributions 1020 can include a marketplace 1021 of various available applications or application packs 1022, widgets 1023 such as comprising UI components 1024, or various services 1025.

In an example embodiment, a starter pack 1030 can be selected by a developer and retrieved from the community contributions 1020. The starter pack 1030 can include sufficient capabilities to enable a developer to quickly get an application up and running, such as including configurable UI components, service adapters, application seed(s), and widgets or other functions.

In an example embodiment, the starter pack 1030 includes an application framework that provides a user interface layer for developers and designers with decoupled solutions for branding, layout, standard components, and context with multiple integration points with the other elements of the platform.

The user interface layer can include style, theme, and layout modules built on an open-source base that provides a responsive grid system, general styling and branding, and support for propagating reusable variables and mix-ins to other layers via a Sass preprocessor. In an example embodiment, modules can be unopinionated with respect to style, and can maintain various branding or presentation rules throughout an application.

In an example embodiment, the starter pack 1030 includes an application seed, scaffolding, or a skeleton application. It can include additional modules or other functions and data. Such a seed can be a starting point for building an application, and can provide some of the capabilities and data (e.g., test data) that can be used for testing services or other data-backed functions. In an example, application packs 1022 can correspond to different types or models of industrial machines or to different use cases or data types. From the starter pack 1030, a developer can download other dependencies or extras via an application manager 1031. The developer can further develop his or her application by linking to various cloud services 1032 (e.g., to retrieve data or analytics already available via other IIoT cloud 106 applications). In an example embodiment, the developer uses various established best practices and guidelines and conforms to various specifications or development standards (e.g., defined by the developer, by an asset manufacturer, etc.), such as to ensure compatibility with other services or applications available in the IIoT cloud 106. Finally, the developed application can be deployed 1050 and pushed to the IIoT cloud 106 for testing or use.

Figure 11:
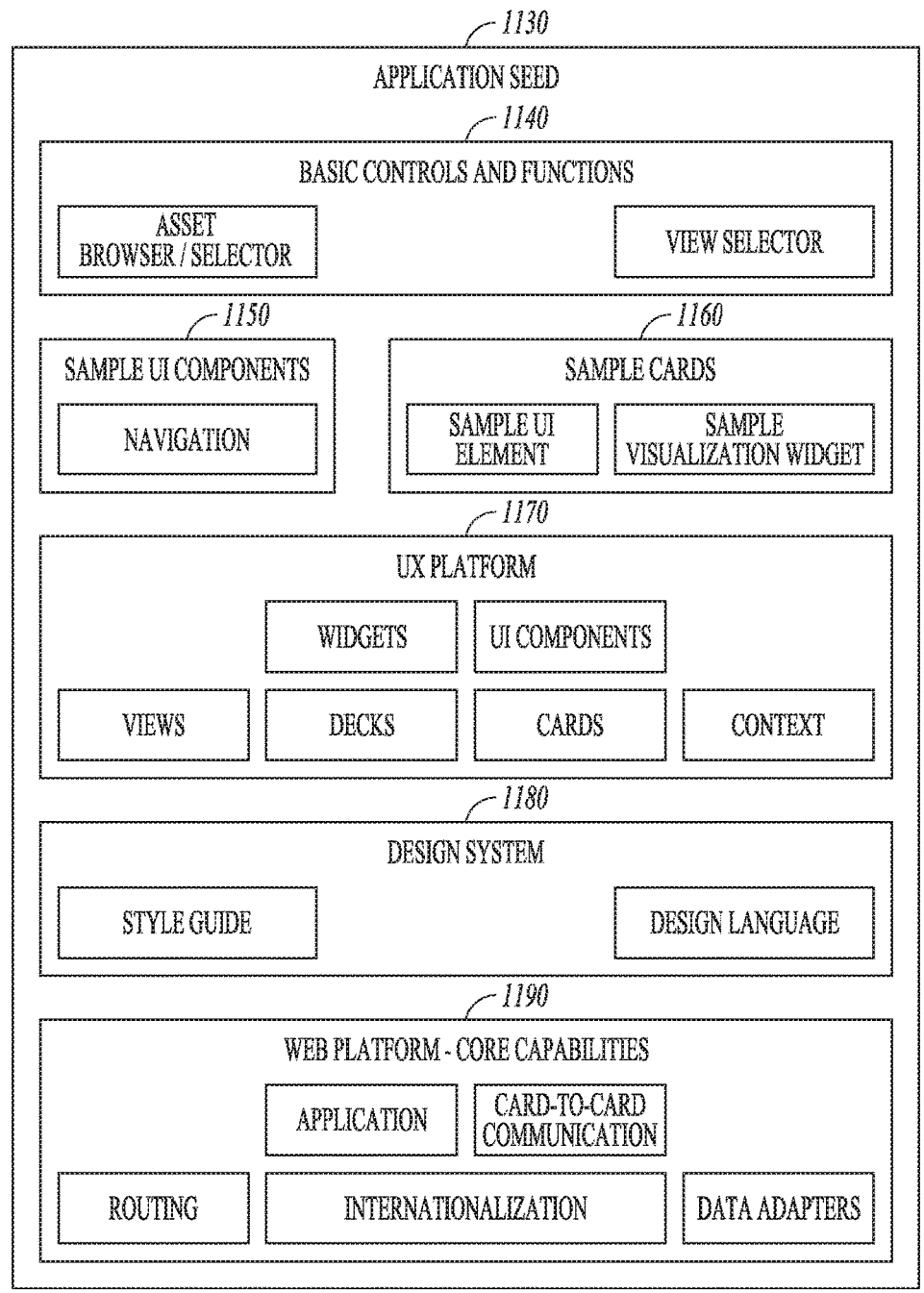
FIG. 11 illustrates generally an example of a framework for an IIoT application seed, in accordance with an example embodiment.

FIG. 11 illustrates generally an example of a framework for an IIoT application seed 1130, in accordance with an example embodiment. The application seed 1130, for example, can be retrieved from the community contributions 1020 and enhanced or refined by a developer to carry out a particular task or objective. In this example embodiment, the application seed 1130 includes various application components including basic controls and functions 1140, sample UI components 1150, sample cards 1160, a user experience (UX) platform 1170, a design system 1180, and a web platform 1190.

In the example embodiment of FIG. 11, the basic controls and functions 1140 include application services for asset browsing or selection, and asset selection viewing. These services can provide basic functionality for locating a particular asset or machine and receiving or viewing data associated with a selected asset or machine. The application seed 1130 further includes the sample UI components 1150, such as can include or use pre-programmed navigation tools. The application seed 1130 can further include various sample or template cards with different sample or example UI elements and visualization widgets. Developers can copy and change various aspects of the sample elements and widgets to suit the unique needs of their applications.

The application seed 1130 can include, in an example embodiment, the UX platform 1170. The UX platform 1170 can be used to define features or components of a user experience. For example, the UX platform 1170 can include definitional or reference items for different application interface views, contexts, decks, and so on, to define how a user experiences the application, such as through various UI components. In an example embodiment, the application seed 1130 includes the design system 1180, such as can be standardized for use across multiple applications in the IIoT system 100. These standards can define application features such as UI data presentation styles or design languages for use by the application. In an example embodiment, the application seed 1130 can further include the web platform 1190. The web platform 1190 can provide various functions such as data intake and routing and storage.

Figure 12:
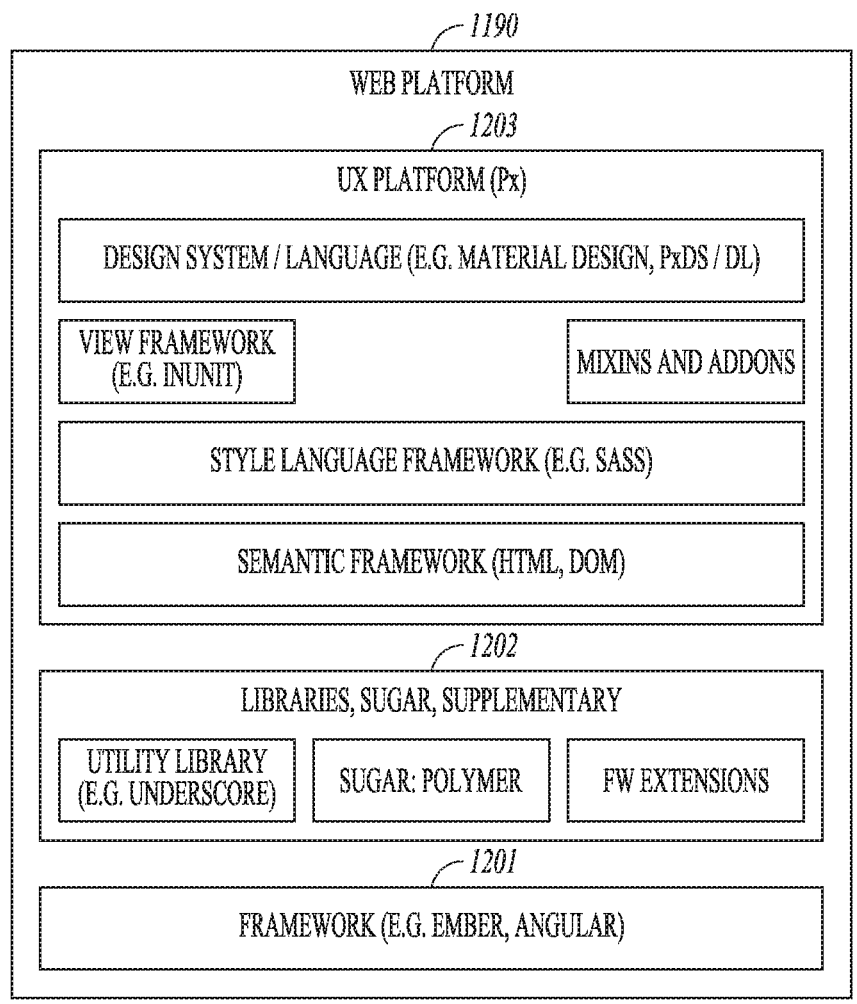
FIG. 12 illustrates generally an example of a web platform framework for an IIoT application, in accordance with an example embodiment.

FIG. 12 illustrates generally an example of a web platform framework for an IIoT application, in accordance with an example embodiment. In this example, the web platform 1190 from the example embodiment of FIG. 11 includes its own UX platform 1203 to define a user experience. The web platform 1190 can be built from a framework 1201 such as Ember, Angular, React, or some other framework, and can use or access various libraries 1202 (e.g., JavaScript libraries). In an example, the UX platform 1203 can have its own semantic framework (e.g., HTML, DOM), style language framework (e.g., SASS), view framework (e.g., Inuit), and other system components.

In an example embodiment, the web platform 1190 can further include a web application framework that supports development of dynamic websites, web-based applications, web services, or web resources. The framework can provide the libraries 1202 for database access, templates, session management, or other functions.

Figure 13:
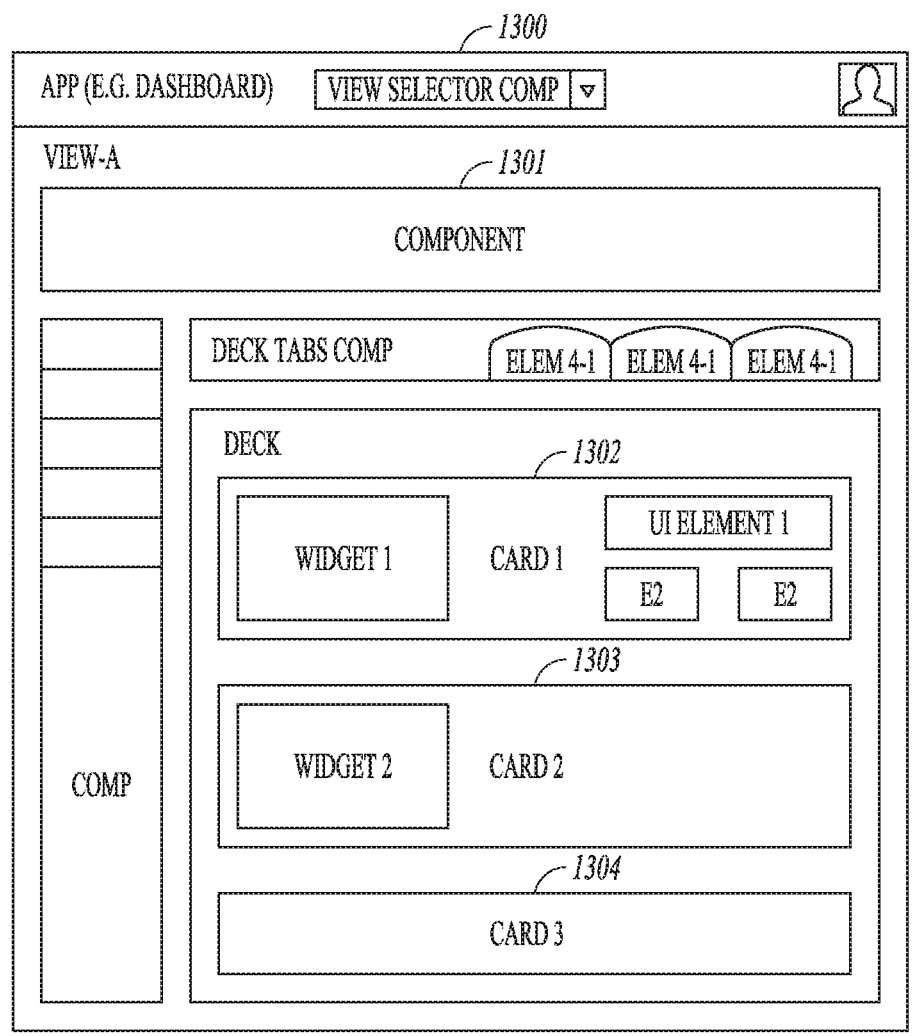
FIG. 13 illustrates generally an example of an application framework, in accordance with an example embodiment.

FIG. 13 illustrates generally an example of an application framework 1300, in accordance with an example embodiment. A context-based user experience can better facilitate use or implementation of Industrial Internet applications. This design principle hinges on the idea that users require particular information presented to them at a particular time and in particular manner to support efficient and effective interaction. Therefore, it can be important to understand the types of users, or personas, who can interact with an Industrial Internet application. By examining each persona and taking time to understand the task or tasks that they perform, an application developer can create a data model that reflects a real-world business flow. Further, because many users can have unique constraints in the field or in the context of a particular industrial machine implementation, it can be important to understand the context in which the application will be used. In an example embodiment, a first design system or a first design mobility system can be used to build such context-based applications.

For example, the first design system can provide Industrial Internet application developers with a comprehensive set of web components that enable them to rapidly assemble user experiences targeted for industrial use cases. The first design system focuses on creating a context-aware application that presents users with appropriate information at a specified appropriate time to perform the next step in some business process.

The first design system can include a set of web components. In the example of FIG. 13, a first component 1301 is shown. In an example embodiment, a primary unit of application development can include a "page" such as can be comprised of several primary areas for user interaction: a header, a navigation bar, a content area, and a footer (see, e.g., FIG. 13). One or more context-based "cards" can be included in the first design system. The example embodiment of FIG. 13 includes several cards 1302, 1303, and 1304. In an example embodiment, a "card" is a primary building block for a view. For example, a card can be created from web components, can be self-contained, and can be shared or saved. Different collections or combinations of cards can be made available to different personas or users.

In an example embodiment, the first design system can include a page or pages with several views, which in turn can have respective "decks" or groups of cards. Views can be context-aware and responsive. Views can be configured to present content in an intelligent, consumable format. A page context can be derived from a variety of factors such as a currently selected asset or assets, a step in a process, or a role of a user. In an example embodiment, a page context is used to enumerate views, decks, or cards in the user experience.

In an example embodiment, a catalog of cards or decks can be provided to an application developer. The cards can be independently developed by an asset user, the cards can be made available by an asset manufacturer, or the cards can be exchanged or shared via a development marketplace. In an example, a card template can be retrieved by a developer from the marketplace 1021 from the example of FIG. 10. A developer can select various ones of the cards to include in an application. For example, the developer can select the cards according to a context that may be required for a particular user or persona to accomplish a particular task. In an example embodiment, a card includes or defines a set of rules for retrieval, analysis, transmission, or display of various asset data.

In an example embodiment, a component can be a part of an application that is built to serve a specific function. It can be a self-contained feature that uses UI elements from the first design system. UI elements can be individual pieces of a consistent visual language used to represent items such as buttons, form fields, drop-downs, or other coded patterns. Together, the components and UI elements can provide a library of useful application widgets that can rapidly be composed in an application and can help to maintain a consistent look and feel.

In an example embodiment, various mobile systems or devices can be configured to communicate with the IIoT cloud 106. A mobile system can be used to prepare always-available mobile applications that are designed to support on and off-line scenarios with a consistent look and feel. For example, a first mobile system can provide a framework that simplifies the building of mission-critical, high performance, always-available mobile applications that function despite network outages. The system can provide cross-platform, multiple form-factor support for major mobile devices, laptops, desktops, or browsers. The first mobile system can synchronize data between remote devices and enterprise data domains, as well as with the IIoT machine 104.

On a client side, the first mobile system can include a flexible and layered component system, with extensible services that support advanced application behaviors, including remote workflow and analytics. Such an architecture simplifies the process of building enterprise-level mobile applications. In an example embodiment, the first mobile system includes an offline-first development system.

The IIoT system 100 can be applied to enhance operations for a single technology or equipment type, or can be applied across an enterprise or industry to enhance system-wide operations. In an example embodiment, the value of Industrial Internet applications can be illustrated by an Asset Performance Management example. Consider a wind farm power generation company, Company X. Wind turbines have numerous sensors that can detect their respective current statuses or conditions. Based on coordination with other wind turbines in a particular field (e.g., belonging to Company X or another company), Company X's turbines can be adjusted to optimize power generation from its entire farm. If sensor data from Company X's wind turbine assets is transferred to the IIoT cloud 106 and analyzed in relation to the data of other farms, new and more efficient algorithms for operating the wind farms can be created and pushed back down to the wind turbines at any one or more of the farms. Additionally, the analysis of historical data of the wind turbines can lead to the discovery of error conditions that cause unplanned downtime. By pushing algorithms that can detect errors or error precursors to the various wind turbines, error conditions can be predicted and a wind turbine or fleet of turbines can be proactively maintained.

Figure 14:
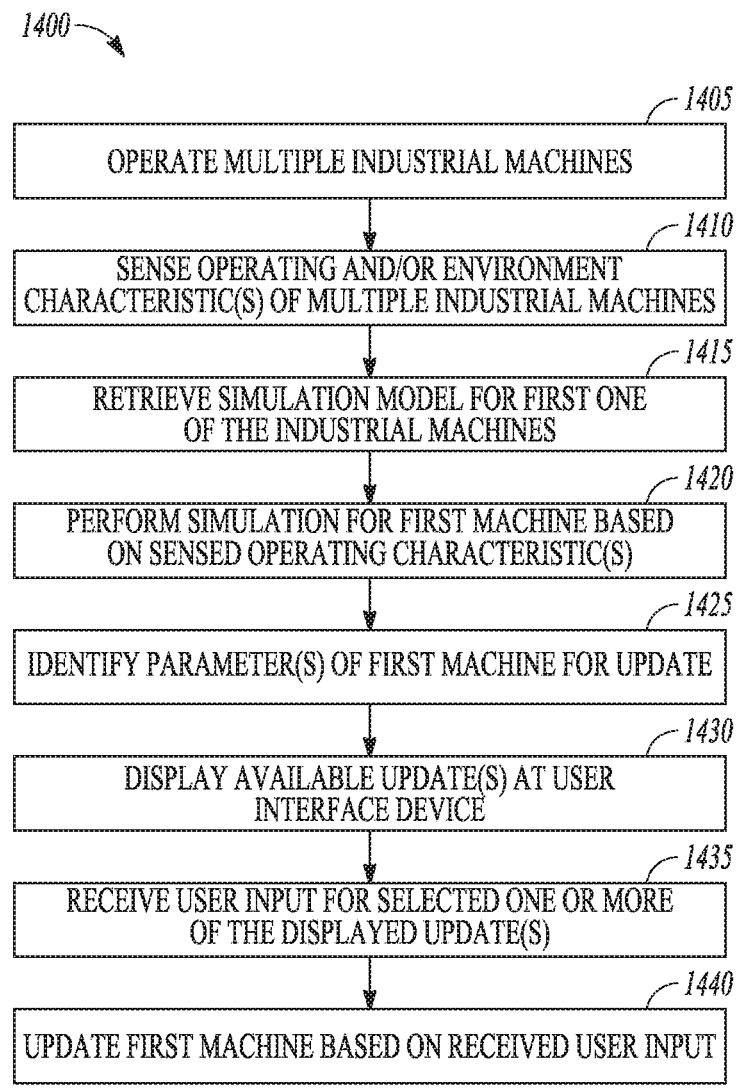
FIG. 14 illustrates generally an example that includes operating multiple industrial machines and updating a machine parameter using information from an IIoT cloud, in accordance with an example embodiment.

FIG. 14 illustrates generally an example 1400 that includes operating multiple industrial assets and updating an asset parameter using information from the IIoT cloud 106, in accordance with an example embodiment. At operation 1405, the example includes operating multiple different industrial machines. An industrial machine can include, among other things, an engine system (e.g., jet engine, propeller engine, vehicle engine, etc.) or component thereof, a power generation system or component thereof, a power distribution system or component thereof, a medical imaging system (e.g., MRI or X-ray imaging system) or component thereof, a medical treatment system or component thereof, a medical records management system or component thereof, a natural resource mining system or component thereof, a vehicle or component thereof, a water processing system or component thereof, a datacenter system or component thereof, or a vessel for navigable waters or component thereof, among other machines or devices. Throughout this document, industrial machines or other devices that are communicatively coupled with the IIoT system 106 and/or the IIoT machine 104 are sometimes referred to as assets. Operating the multiple different industrial machines at 1405 includes operating multiple instances of machines or assets of the same or similar type. The example can include operating multiple wind turbine asset instances, such as from a first asset community.

At operation 1410, the example 1400 includes sensing operating and/or environment characteristics about the multiple industrial machines being operated at operation 1405. The operating and/or environmental characteristics can be sensed or determined using sensors that are integrated with or appurtenant to the respective industrial machines. In an example embodiment, a single sensor senses information about multiple different machines, such as when the sensor is coupled to or configured to monitor multiple different machines. For example, a machine vision sensor can be configured to monitor operations for multiple different but co-located pick-and-place robot systems. In an example embodiment, the operating and/or environmental characteristics are sensed or determined using sensors that are provided by an original equipment manufacturer for the machines. Various sensor nodes (see, e.g., FIG. 3 at 331) can be used to acquire machine data and communicate the machine data to the IIoT cloud 106.

At operation 1415, the example 1400 includes retrieving a simulation model for a first one of the industrial machines being operated at operation 1405. Optionally, multiple models corresponding to the multiple industrial machines can be retrieved. The model or models can be retrieved from the IIoT cloud 106, or can be retrieved from the IIoT machine 104 or other location coupled to the IIoT cloud 106. In an example embodiment, the model is supplied by or available from a manufacturer of the asset to be modeled. The model can be configured to provide information about asset wear or longevity, to provide information about or assess asset wear conditions, asset failure modes, an asset response to environmental conditions, asset fatigue or asset component fatigue, or other asset operating conditions.

At operation 1420, the example 1400 includes performing a simulation for a first machine of the multiple machines being operated at operation 1405. The simulation includes using information about the operating and/or environment characteristics sensed at 1410. The simulation can be performed using a processor circuit or dedicated analyzer circuit at the IIoT cloud 106. In an example embodiment, the simulation receives inputs from one or more assets (e.g., similarly or dissimilarly situated) and processes the inputs according to a physics-based model of the first machine. In an example embodiment, the physics-based model is updated based on historical or operational analytics, such as provided by the analytics services 823 in the example embodiment of FIG. 8.

In an example embodiment, the simulation at operation 1420 includes using operational or historical data about one or more machines. For example, a first simulation can be performed using a static model of the first machine and using information about present machine conditions from the operating and/or environment characteristics sensed at operation 1410 for the same or a different machine or machines. In an example embodiment, a second simulation can be performed using a dynamic model of the first machine that is updated over time, such as can be updated using operational data that is periodically or intermittently received from the machine sensors corresponding to one or more machines. That is, historical data can optionally be collected from multiple machines and then used to inform a simulation model for the first machine over time.

At operation 1425, the example 1400 includes identifying one or more machine parameters for a machine type simulated at operation 1420. In an example embodiment, the identified parameters are for the first machine and are a result of the simulation performed at operation 1420. The parameters can include machine-implemented controls for the first machine. In an example embodiment, the parameters include threshold conditions, conditions for operating a machine at or near edge conditions, or other machine-type-specific conditions. In an example that includes a wind turbine machine type, a parameter can include a turbine pitch or orientation angle relative to an incoming airflow direction or incoming airflow rate, a permissible rotation rate, an airfoil type or orientation, or other parameter.

At operation 1430, the example 1400 includes displaying available parameter updates at a user interface device. For example, the displaying at 1430 can include using the interface device 140. In an example that includes simulating a wind turbine asset, the displaying can include providing a turbine operator with multiple different options for a pitch parameter. At operation 1435, the example 1400 includes receiving a user input indicating a selected one of the available updates displayed at the user interface device. For example, a user indication can be received for a selected pitch parameter for a wind turbine. At operation 1440, the example 1400 includes updating the first machine based on the user input received at operation 1435. For example, the selected pitch parameter can be implemented at the first machine. At operation 1440, the updating can include pushing machine parameter changes to one or more machines, such as multiple machines in a particular designated fleet, or multiple machines belonging to a particular class or enterprise.

Figure 15:
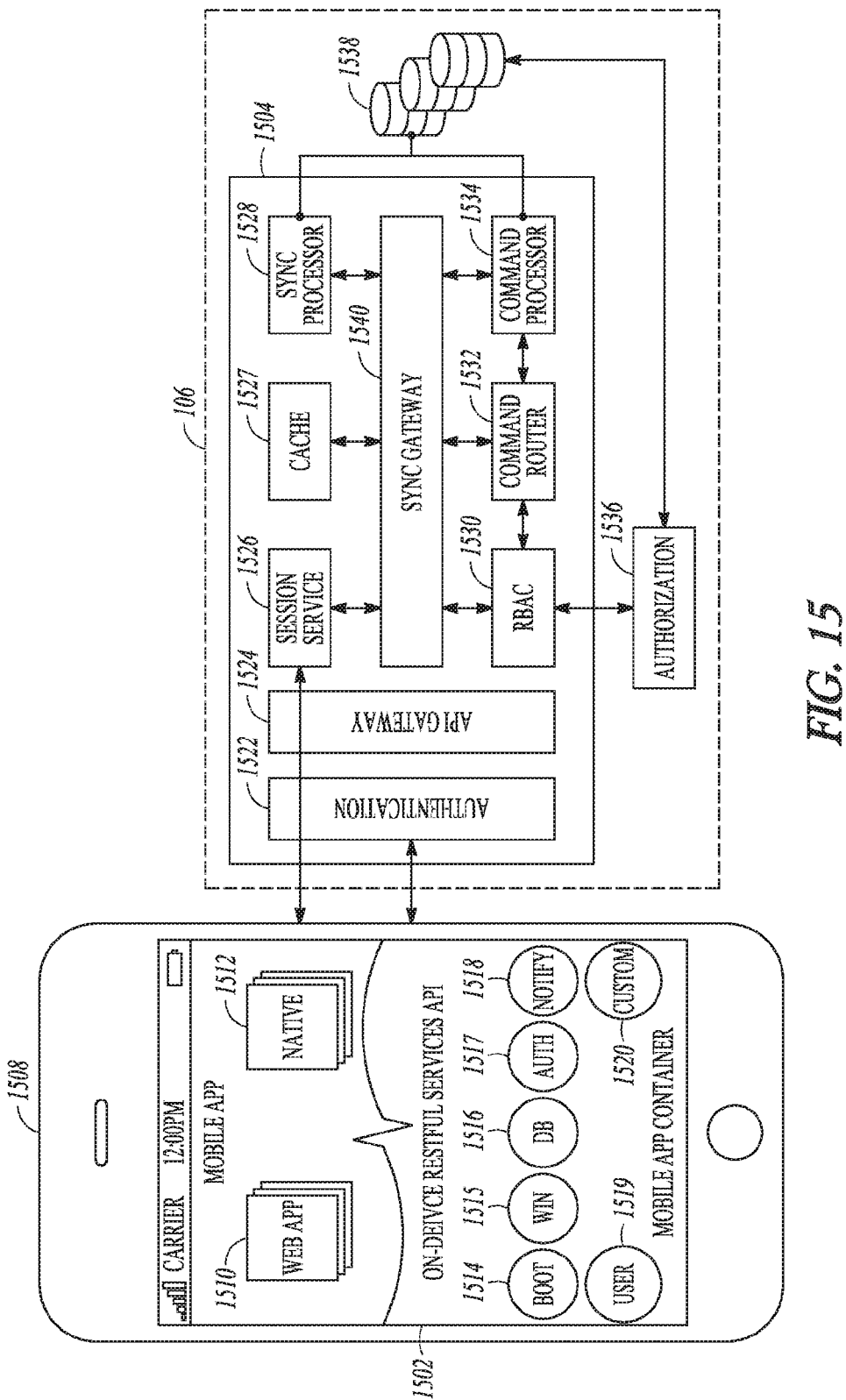
FIG. 15 is a block diagram illustrating an instance of a software development kit (SDK) on an interface device such as a mobile device, and an IIoT cloud comprising a mobile service platform, in accordance with an example embodiment.

FIG. 15 is a block diagram illustrating an instance of an SDK 1502 on an interface device (e.g., the interface device 140 from FIG. 1) such as a mobile device 1508, and the IIoT cloud 106 comprising a mobile service platform 1504. In an example embodiment, an SDK can be provided for a developer to use to create one or more mobile industrial internet applications. The industrial internet applications can be a webapp 1510 or a native app 1512. In an example embodiment, multiple applications can be developed and linked together.

In an example embodiment, one industrial internet application can comprise multiple webapps 1510. In this example, each webapp 1510 can be a separate component of the industrial internet application. For example, one webapp 1510 can be developed for moving train cars from one location to another in a rail yard, and another webapp 1510 can be developed for searching for cars and displaying a visual representation of the rail yard with locations of the cars. A webapp 1510 can be a web application or application built with web technologies. One example of a webapp 1510 is an application comprised of Web Browser interpretable languages, such as but not limited to, HTML, JavaScript, CSS, and the like.

These industrial internet applications can also be referred to herein as an application or app. An industrial internet application can be used for accessing, generating, and storing data related to one or more industrial assets. The one or more webapps 1510 or native apps 1512 can run on top of an on-device restful services API.

An instance of the SDK can be referred to as a mobile app container 1502 or an industrial internet application container. The mobile app container 1502 can comprise a number of services. For example, the mobile app container 1502 can comprise a boot service 1514, a window (win) service 1515, a database 1516, an authentication service 1517, a notify service 1518, a user service 1519, and one or more custom services 1520. This collection of services can be on-device RESTful services that can be extended, modified, and/or replaced.

The boot service 1514 provides a sequence for starting up an application. The boot service 1514 can start the application initialization process or reinitialize an application. The boot service 1514 can be standard within the SDK such that a developer can use the boot service 1514 as is, or the developer can develop a custom boot service which would replace the boot service 1514.

The boot service uses the authentication (auth) service 1517 to manage online and offline authentication for the application. In the case where the user starts up the app for the first time the boot service delegates to the auth service 1517 to prompt the user for a password, personal identification number (PIN), an offline PIN, or other similar text or combination, which will be used in the case where the user starts the app when the app is offline.

After the offline PIN has been created the boot service ensures that the user is authenticated via the online authentication or offline authentication. The boot service can ensure that a user who is authenticated with the offline PIN cannot access backend services until the user has been authenticated online.

An example method and Uniform Resource Locator (URL) that can be used to start the application initialization process can comprise: POST http://pmapi/boot/start. An example method and URL for reinitializing an application can comprise: POST http://pmapi/boot/restart. For example, the mobile device 1508 can send a request to initialize or reinitialize an application, to an industrial asset cloud computing system (e.g., a mobile service platform 1504 of the IIoT cloud 106). Once the user is authenticated the system (e.g., the mobile service platform 1504) determines whether it is the first time the user is accessing the system and whether or not the application is loaded on the device (e.g., mobile device 1508). If the application has not yet been loaded on the mobile device 1508, the application will be replicated from the mobile service platform 1504 and installed onto the mobile device 1508 and launched. On subsequent logins, any updates to the application will be replicated and launched. For example, a developer can post updates to the application at any time and the next time a user logs into the mobile service platform 1508, the update will be replicated and launched on the mobile device 1508. This allows a developer of the application to update the application and to publish the updates immediately.

The win service 1515 can control the windows (e.g., user interface (UI) displays) in which the application is running. For example, the win service 1515 can be used to manage the display of webapps 1510 in the container user interface. An application can typically run in a single window; however, there can be some scenarios when an application can run in multiple windows. One example of such a scenario is an application used at a nurse's station to monitor patients. The nurse's station can be monitoring twenty patients, and thus, can have twenty windows running, one for each patient. The win service 1515 keeps track of these windows.

An example method and URL for loading a specified web page can comprise: POST http://pmapi/window/pane?webapp=appname. When the win service 1515 receives the request, it can open a webview (for example) on the device to load the application. The database 1516 can store various data related to the mobile industrial internet application(s). For example, the database 1516 can store data related to one or more industrial assets, information related to the industrial asset application, information related to a user of the industrial asset application, and so forth. The database keeps in sync with the cache 1527 in the mobile service platform 1504, and thus, keeps in sync with a data domain 1538. In an example embodiment, the database 1516 can be a NoSQL database. Database services can be provided that provide local database management services. The database services can comprise a data access high-level service and a data access low-level service.

The data access high-level service can provide local database management services and an abstraction layer to simplify data-access interactions such as saving and retrieving documents. An example method and URL for starting replication of data and continuing as long as the device has connectivity and is authenticated can comprise: POST http://pmapi/db/databaseName/replication. An example method and URL for retrieving replication status can comprise: GET http://pmapi/db/databaseName/replication. An example method and URL for retrieving a document can comprise: GET http://pmapi/db/databaseName/document/documentId. An example method and URL for closing a database can comprise: POST http://pmapi/db/close.

The data access low-level service can perform basic data retrieval and updates for the local document database. The service can provide create, read, write, and delete document (e.g., data object) operations and query views. This service supports database-level commands (e.g., rather than server-level commands).

The authentication service 1517 facilitates tasks such as login, logout, and management and validation of offline authentication credentials. For example, the authentication service 1517 can request user login information (e.g., user name, password, etc.) and interface with a security module (e.g., authentication service 1522) of the mobile service platform 1504, to authenticate a user of the mobile industrial internet application. Authentication can be conducted via a standard of authentication such as a uniform authentication and authorization system (UAA) or other such system.

The notify service 1518 can relay event notifications from the mobile device 1508 to the webapp 1510, or it can alert a user at a specific time if the container app is not running. For example, the notify service 1518 can run a JavaScript function in the current webapp when the following conditions are met: a specific database document (e.g., data object) changes, the application is about to go into the background, the device's connectivity state has changed, the device is currently replicating data with the server, a specific time is reached, and so forth. Other example notifications can include notifications from remote systems, such as push notifications. Another example notification can be a device state change such as backgrounding, foregrounding, termination, and changes to the physical device state itself such as location and orientation changes.

An example method and URL for utilizing event notifications can comprise: POST http://pmapi/notify/events/<notificationName>. Some examples of "notificationName," which can be subscribed to, can include ReachabilityWatcherNotification, which is posted when a reachability watcher detects a connectivity state change; DatabaseDownloadNotification, which describes the current download state; DocumentChangedNotification/<docid>, which describes document changes; and InitialReplicationCompleteNotification, posted when the local database has completed its first replication (e.g., indicating that the database is considered up-to-date and it is safe to store and retrieve data).

For example, the notify service 1518 can provide notification to the mobile industrial internet application that there is data that has been changed. In an example embodiment, the notify service 1518 can provide a notification to the user that a particular document in which the user can be interested has been changed. One example scenario could be a mobile industrial internet application that is used to monitor train cars in a rail yard. In the rail yard there can be users of the mobile industrial internet application that are getting orders from a train management system (e.g., source of truth or data domain 1538) that keeps track of all of the train cars (e.g., location, movement, etc.). For example, the train management system can be prioritizing which cars get unloaded first, which cars get loaded first and put on the next train headed out, and so forth. The users can get orders from the train management system through their mobile devices (e.g., via the mobile industrial internet application). When a user moves a car, the user can also send a message to the back end train management system that the car has been moved. This information can be broadcast to other interested users. For instance, another mobile industrial internet application running on another user's mobile device can receive a notification of the updated car location. This can be a textual message, a digital representation of where the car is located, and so forth.

The user service 1519 can comprise a user information service and a user settings service. The user information service identifies the user that is currently logged into the mobile industrial internet application. For example, the user information service can contain information such as the user's name, identity, and other properties associated with the user (e.g., contact information such as address and phone number, etc.). The user information service can be used to retrieve a logged-in user and display the user's assigned data elements (e.g., such as a work item). An example method and URL for retrieving user information can comprise: GET http://pmapi/user. An example method and URL for retrieving a specified data element for the user can comprise: GET http://pmapi/user/data-element. An example method and URL for writing the user information can comprise: POST http://pmapi/user.

The user settings service can facilitate unencrypted data storage and retrieval on a given device. The user setting service can be used to define user preferences, or to define information that needs to persist when the application stops running, but is not security-sensitive or required to be stored in the local database. An example method and URL for retrieving the user settings based on a setting key can comprise: GET http://pmapi/usersettings/settingkey. An example method and URL for retrieving all user settings can comprise: GET http://pmapi/usersettings. An example method and URL for setting the user settings based on the settings key can comprise: POST http://pmapi/usersettings/settingkey. An example method and URL for storing user settings can comprise: POST http://pmapi/usersettings. An example method and URL for deleting a specified user's settings based on a setting key can comprise: DELETE http://pmapi/usersettings/settingkey.

The base SDK can comprise the boot service 1514, the win service 1515, the database 1516, the authentication service 1517, the notify service 1518 and the user service 1519. In addition, the SDK can provide an ability for a developer to add one or more additional custom service 1520. The one or more custom services 1520 developed by the developer can be included in the mobile app container 1502 and can be interfaced in the same way as the other services (e.g., as a RESTful service). For example, since the SDK is open and extensible, it gives a developer the flexibility to change the base functionality of the application container to support additional functionality that is unique to the application that the developer is building (e.g. adding a custom service to communicate directly with an industrial machine, such as using a proprietary protocol.)

The mobile device 1508 can be coupled with the IIoT cloud 106 via one or more networks as described earlier. The IIoT cloud 106 can comprise a mobile service platform 1504. The mobile service platform 1504 can comprise one or more server computers and can utilize one or more databases for providing various services and functionality. The mobile service platform 1504 supports industrial internet applications (e.g., webapp 1510 and native app 1512) that need offline support and integration with a data domain 1538, including enterprise systems, third-party services and microservices, such as services rendered by the asset module 108A, analytics module 108B, data module 108C, and security module 108E, etc., as shown in FIG. 1.

The mobile service platform 1504 can comprise an authentication service 1522. As described above, the authentication service 1522 can provide authentication services to authenticate a user of the mobile device and industrial internet application (e.g., industrial internet application 114). Authentication can be conducted via a standard of authentication such as a uniform authentication and authorization system (UAA) or other such system, as further discussed herein. Among other things, the authentication service 1522 can receive and respond to authentication requests from one or more mobile devices 1508 in the same or similar way to which machine authorization requests are handled by the IIoT cloud 106 (see, e.g., FIGS. 5-7).

The mobile service platform 1504 can comprise an API gateway 1524 that receives requests and commands from a mobile device 1508 and sends data to the mobile device 1508. For example, the mobile device 1508 can send a request to the IIoT cloud 106 via the API gateway 1524 to synchronize (sync) data between the local database 1516 of the mobile device 1508 and the cache 1527 and data domain 1538.

The mobile service platform 1504 can comprise a session service 1526. The session service 1526 can ensure users are authorized to access data from a data domain 1538. For example, the session service 1526 can send a message to a role-based access control system 1530 (RBAC) for a user to be authorized via the authorization service 1536. The RBAC 1530 and/or the authorization service 1536 can apply rules and policies determined by a data domain 1538 for which users can access which data from the data domain 1538. For example, there can be a private channel of data that only users in an executive group can be able to access.

The session service 1526 can create a client session on a sync gateway 1540 to establish a connection to sync data between the local database 1516 of the mobile device 1508 and the cache 1527 and/or data domain 1538. Once the connection to sync data is established, the database 1516 associated with the mobile device 1508 and the cache 1527 can be synced. For example, whatever data the local database 1516 has access to will be replicated down from the cache 1527 and be put into the database 1516. Updates can continue until the user of the mobile device 1508 logs off or is otherwise disconnected.

The mobile service platform 1504 can comprise a command router 1532 to route a command, comprising instructions for providing an update to data in the data domain 1538, to the responsible command processor 1534, of a plurality of command processors, which is responsible for handling the command. In the event an error occurs, the command router 1532 can update the command with the error information as a notification to the mobile industrial internet application. A command can comprise header properties that contain information for use by the command router 1532 in mapping to a command processor 1534. The command can further comprise a payload that contains application data for the command processor 1534 to complete the command request.

The command processor 1534 can comprise a plurality of processes for processing commands and for communicating with the data domain 1538. In an example embodiment, a developer of an industrial internet application can develop various processes for handling commands to update data in the data domain 1538. The command processor 1534 can write data to the data domain 1538. The command processor 1534 can primarily be responsible for updating the source data in the data domain 1538. The command processor 1534 can also perform other tasks, such as managing data access for a user.

The sync processor 1528 connects to the data domain 1538 to pull data for a particular industrial internet application, related to one or more particular machine or asset, related to a particular service region for one or more machines or assets, and so forth. The sync processor 1528 can read data from the data domain 1538. For example, the sync processor 1528 can detect a state change in the data domain 1538, and can copy data related to the state change out of the data domain 1538 and put it into the cache 1527 to be replicated to all of the mobile devices 1508 that have access to the data. In an example embodiment, the sync processor 1528 can perform the following tasks: gather data from the data domain 1538, transform the data into a JSON object or document, write the document to the cache 1527, or define access to the JSON object.

The data pulled by the sync processor 1528 can be stored in the cache 1527. The cache 1527 can be a NoSQL database, a document database, or other type of database, or a combination of different types of databases.

The sync processor 1528 can also be configured to set up which users are authorized to access specified data. In an example embodiment, a developer of an industrial internet application can develop instructions for how to connect and pull data from the data domain 1538 and which users are authorized to access data in the data domain 1538.

The sync gateway 1540 can receive commands with instructions for updating data in a data domain 1538, store commands in the cache 1527, receive changed data and store the changed data in the cache 1527, manage sessions, and so forth.

The data domain 1538 can be a source of truth for a particular entity or set of assets. For example, the data domain 1538 can be a source of truth for a railroad management system that keeps track of all the assets along the rail line. The data domain 1538 is shown as residing outside of the IIoT cloud 106, however, the data domain 1538 can reside outside of the IIoT cloud 106 or can have some components inside the IIoT cloud 106 and some components outside the IIoT cloud 106. For example, the data domain 1538 for a particular entity can comprise legacy systems that exist outside of the IIoT cloud 106 and can utilize services of the IIoT cloud 106 to extend functionality to mobile devices. The data domain 1538 can comprise an asset system, a timeseries system, a blobstore, Asset Performance Management (APM), train management, health information system, sales force, and so forth.

The system in the example embodiment of FIG. 15 can represent a simplified front-end to the IIoT cloud 106, including various microservices available to users of the mobile device 1508 to capture or otherwise manipulate data from the industrial machines 200 and/or the IIoT cloud 106. Analytic results, such as performed locally by the mobile device 1508 or remotely by the IIoT cloud 106 (e.g., using data received via the mobile device 1508), can be pushed to the same or different devices or machines, such as via the IIoT cloud 106, to enhance operability of one or more machines or assets.

In an example embodiment, one or more of the command router 1532, command processor 1534, data domain 1538, and the mobile device 1508 can be configured to carry out Command and Query Responsibility Segregation (CQRS) by segregating the operations that read data (e.g., queries) from operations that update data (e.g., commands) by using separate interfaces. In this embodiment, data models used for querying and data models used for updates can be different or isolated from each other. A query model for reading data and an update model for writing data can be configured to access the same physical store, such as the data domain 1538, such as using SQL views. In other embodiments, the models can be configured to access separate or dedicated data stores, such as to maximize performance, scalability, and security. Dividing a data store into separate physical stores, such as for read and write operations, can introduce complexity to the system. For example, a read model store must be updated to reflect changes to the write model store, and it can be difficult to identify user requests for stale data. One solution can include using event sourcing in conjunction with CQRS so that the write model is an append-only stream of events driven by commands. These events can in turn be used to update views that act as the read model.

In an example embodiment, a unidirectional data flow can be provided between the mobile device 1508 and one or more services at the IIoT cloud 106. For example, data or analytic results that originate from a service at the IIoT cloud 106 can be replicated to the mobile device 1508 via a first data object, and can additionally, in parallel, be sent to a back-end system for archiving. Upon replication of the mobile device 1508 with the back-end system (e.g., using the sync processor 1528) the first data object can be checked and verified to ensure compatibility and consistency between the mobile device 1508 and the back-end system.

Data or analytic results that originate at the mobile device 1508 (e.g., data or observations collection in the field about one or more machines, business processes, etc.) can be put into command form and sent to the back-end system (e.g., including the data domain 1538 or other destination at the IIoT cloud 106). At the command processor 1534, the data or analytic results can be routed to a particular specified destination, such as can include the machine or asset to which the data or analytic result corresponds. In this manner, a unidirectional data flow can be achieved to prevent data collisions and timing or processing errors.

Figure 16:
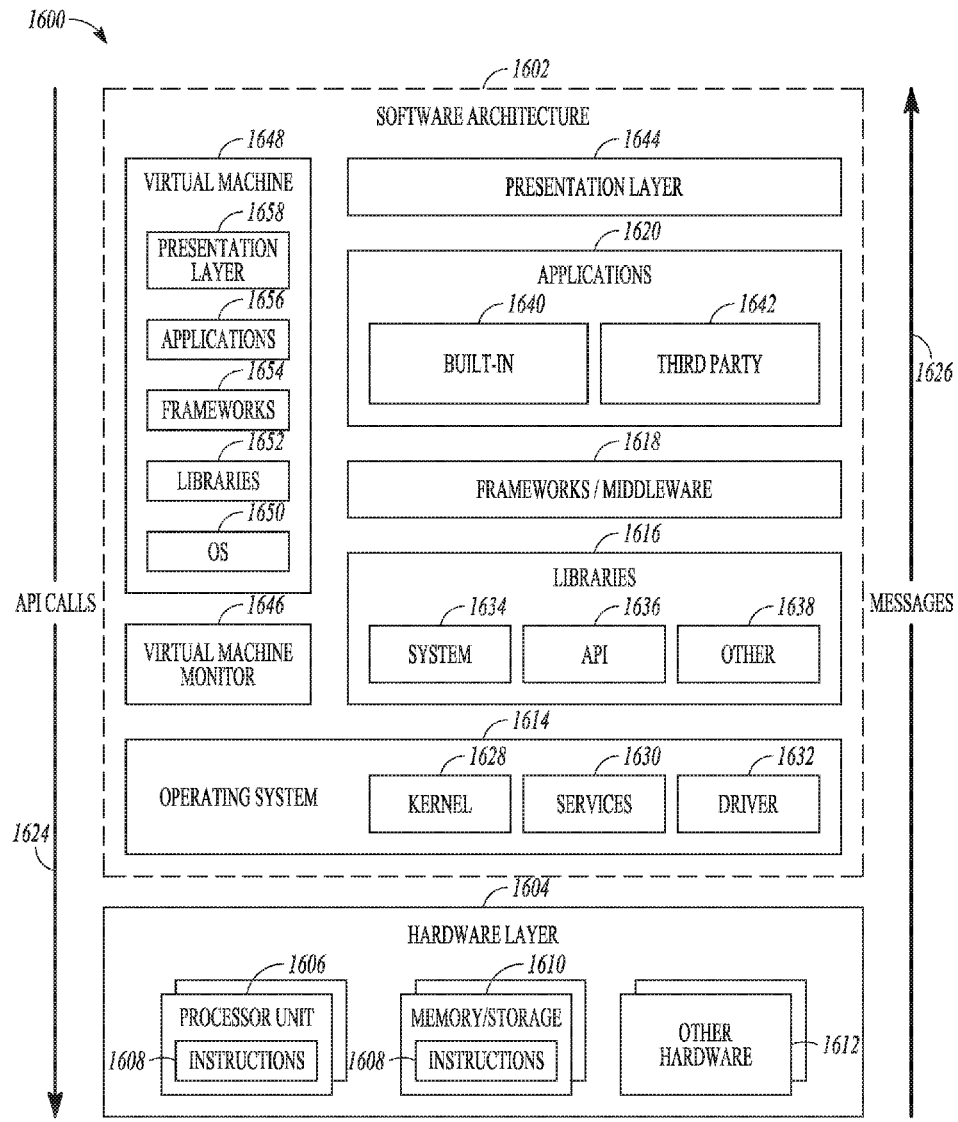
FIG. 16 is a block diagram illustrating a representative software architecture which may be used in conjunction with various hardware architectures herein described.

FIG. 16 is a block diagram 1600 illustrating a representative software architecture 1602, which may be used in conjunction with various hardware architectures herein described. FIG. 16 is a non-limiting example embodiment of a software architecture 1602, and it will be appreciated that many other architectures may be implemented to facilitate the functionality described herein. The software architecture 1602 may be executing on hardware such as a machine 1700 of FIG. 17 that includes, among other things, processors 1710, memory/storage 1730, and I/O components 1750. A representative hardware layer 1604 is illustrated and can represent, for example, the machine 1700 of FIG. 17. The representative hardware layer 1604 comprises one or more processing units 1606 having associated executable instructions 1608. The executable instructions 1608 represent the executable instructions of the software architecture 1602, including implementation of the methods, modules, and so forth herein. The hardware layer 1604 also includes memory and/or storage modules 1610, which also have the executable instructions 1608. The hardware layer 1604 may also comprise other hardware 1612, which represents any other hardware of the hardware layer 1604, such as the other hardware illustrated as part of the machine 1700.

In the example architecture of FIG. 16, the software architecture 1602 can be conceptualized as a stack of layers where each layer provides particular functionality. For example, the software architecture 1602 can include layers such as an operating system 1614, libraries 1616, frameworks/middleware 1618, applications 1620, and a presentation layer 1644. Operationally, the applications 1620 and/or other components within the layers can invoke API calls 1624 through the software stack and receive a response, returned values, and so forth illustrated as messages 1626 in response to the API calls 1624. The layers illustrated are representative in nature, and not all software architectures have all layers. For example, some mobile or special purpose operating systems may not provide a frameworks/middleware 1618, while others can provide such a layer. Other software architectures can include additional or different layers.

The operating system 1614 may manage hardware resources and provide common services. The operating system 1614 may include, for example, a kernel 1628, services 1630, and drivers 1632. The kernel 1628 may act as an abstraction layer between the hardware and the other software layers. For example, the kernel 1628 may be responsible for memory management, processor management (e.g., scheduling), component management, networking, security settings, and so on. The services 1630 may provide other common services for the other software layers. The drivers 1632 may be responsible for controlling or interfacing with the underlying hardware. For instance, the drivers 1632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In an example embodiment, the libraries 1616 can provide a common infrastructure that can be used by the applications 1620 and/or other components and/or layers. The libraries 1616 typically provide functionality that allows other software modules to perform tasks in an easier fashion than to interface directly with the underlying operating system 1614 functionality (e.g., kernel 1628, services 1630, and/or drivers 1632). The libraries 1616 can include system libraries 1634 (e.g., C standard library) that can provide functions such as memory allocation functions, string manipulation functions, mathematic functions, and the like. In addition, the libraries 1616 can include API libraries 1636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 1616 can also include a wide variety of other libraries 1638 to provide many other APIs to the applications 1620 and other software components/modules.

The frameworks/middleware 1618 can provide a higher-level common infrastructure that can be utilized by the applications 1620 and/or other software components/modules. For example, the frameworks/middleware 1618 can provide various graphic user interface (GUI) functions, high-level resource management, high-level location services, and so forth. The frameworks/middleware 1618 can provide a broad spectrum of other APIs that can be utilized by the applications 1620 and/or other software components/modules, some of which can be specific to a particular operating system or platform.

The applications 1620 can include built-in applications 1640 and/or third-party applications 1642. Examples of representative built-in applications 1640 can include, but are not limited to, a contacts application, a browser application, a book reader application, a location application, a media application, a messaging application, and/or a game application. Third-party applications 1642 can include any of the built-in applications 1640 as well as a broad assortment of other applications. In a specific example, the third-party application 1642 (e.g., an application developed using the Android™ or iOS™ software development kit (SDK) by an entity other than the vendor of the particular platform) can be mobile software running on a mobile operating system such as iOS™, Android™, Windows® Phone, or other mobile operating systems. In this example, the third-party application 1642 can invoke the API calls 1624 provided by the mobile operating system such as the operating system 1614 to facilitate functionality described herein (see, e.g., discussion of FIG. 15 and example mobile device 1508).

The applications 1620 can use built-in operating system functions (e.g., kernel 1628, services 1630, and/or drivers 1632), libraries (e.g., system libraries 1634, API libraries 1636, and other libraries 1638), and frameworks/middleware 1618 to create user interfaces to interact with users of the system. Alternatively, or additionally, in some systems, interactions with a user can occur through a presentation layer, such as the presentation layer 1644. In these systems, the application/module "logic" can be separated from the aspects of the application/module that interact with a user.

Some software architectures utilize virtual machines. In the example of FIG. 16, this is illustrated by a virtual machine 1648. A virtual machine creates a software environment where applications/modules can execute as if they were executing on a hardware machine (such as the machine 1700 of FIG. 17, for example). The virtual machine 1648 is hosted by a host operating system (operating system 1614 in FIG. 11) and typically, although not always, has a virtual machine monitor 1646, which manages the operation of the virtual machine 1648 as well as the interface with the host operating system (i.e., operating system 1614). A software architecture executes within the virtual machine 1648, such as an operating system 1650, libraries 1652, frameworks/middleware 1654, applications 1656, and/or a presentation layer 1658. These layers of software architecture executing within the virtual machine 1648 can be the same as corresponding layers previously described or may be different.

Figure 17:
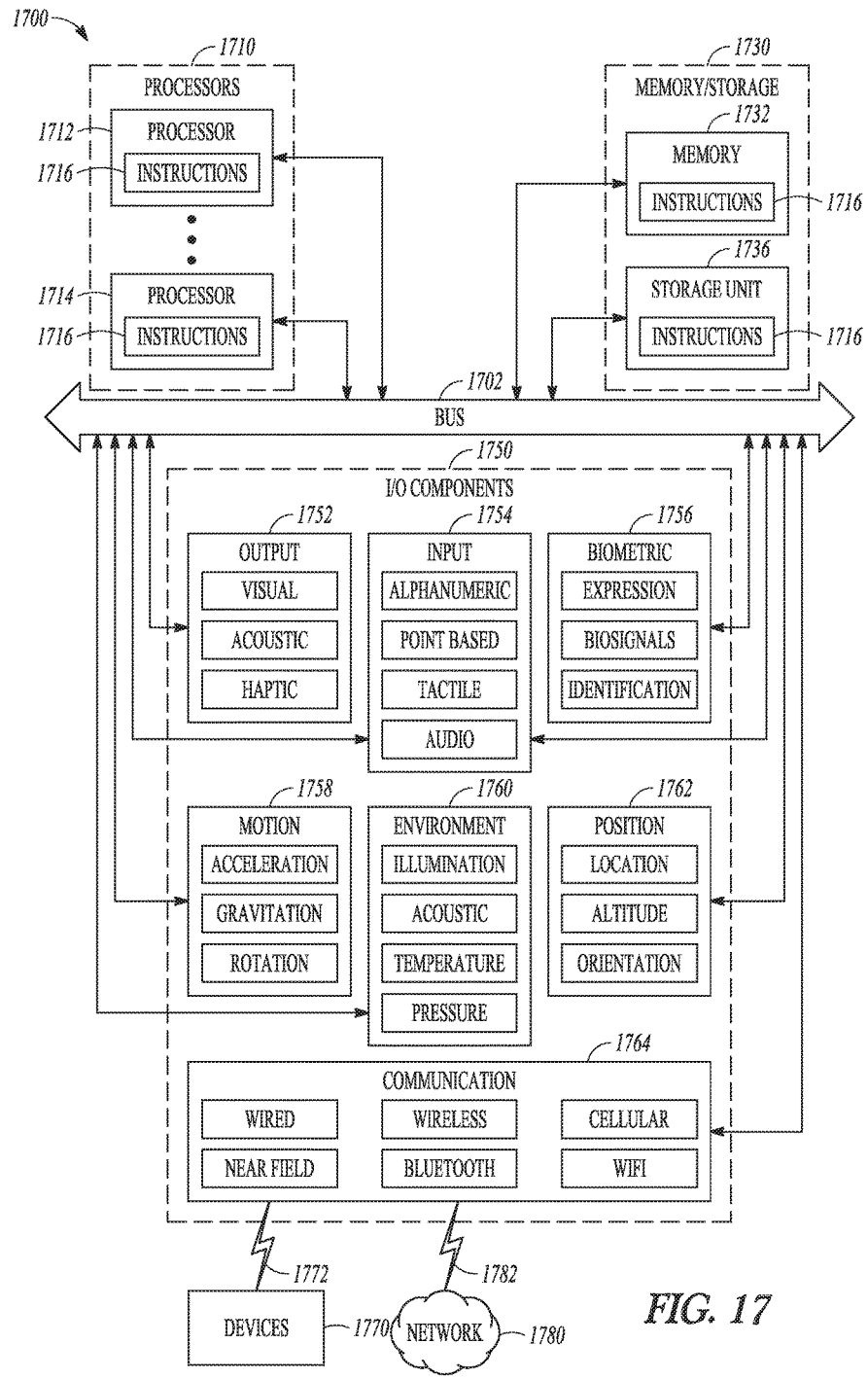
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions 1716 from a machine-readable medium (e.g., a machine-readable storage medium) and perform any one or more of the methodologies discussed herein. Specifically, FIG. 17 shows a diagrammatic representation of the machine 1700 in the example form of a computer system, within which the instructions 1716 (e.g., software, a program, an application, an applet, an app, or other executable code) for causing the machine 1700 to perform any one or more of the methodologies discussed herein may be executed. For example, the instructions 1716 can implement modules of FIG. 1, and so forth. The instructions 1716 transform the general, non-programmed machine 1700 into a particular machine programmed to carry out the described and illustrated functions in the manner described. In alternative embodiments, the machine 1700 operates as a standalone device or can be coupled (e.g., networked) to other machines. In a networked deployment, the machine 1700 can operate in the capacity of a server machine or a client machine in a server-client network environment, or as a peer machine in a peer-to-peer (or distributed) network environment.

The machine 1700 can comprise, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 can include processors 1710, memory/storage 1730, and I/O components 1750, which can be configured to communicate with each other such as via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) can include, for example, a circuit such as a processor 1712 and a processor 1714 that may execute the instructions 1716. The term "processor" is intended to include a multi-core processor 1712, 1714 that can comprise two or more independent processors 1712, 1714 (sometimes referred to as "cores") that may execute the instructions 1716 contemporaneously. Although FIG. 17 shows multiple processors 1710, the machine 1700 may include a single processor 1712, 1714 with a single core, a single processor 1712, 1714 with multiple cores (e.g., a multi-core processor 1712, 1714), multiple processors 1712, 1714 with a single core, multiple processors 1712, 1714 with multiples cores, or any combination thereof.

The memory/storage 1730 can include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the cache memory of processor 1712, 1714), or any suitable combination thereof, during execution thereof by the machine 1700. Accordingly, the memory 1732, the storage unit 1736, and the memory of the processors 1710 are examples of machine-readable media.

As used herein, "machine-readable medium" means a device able to store the instructions 1716 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1750 that are included in a particular machine 1700 will depend on the type of machine 1700. For example, portable machines such as mobile phones (see, e.g., the mobile device 1508) will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion, and the grouping is in no way limiting. In various example embodiments, the I/O components 1750 may include output components 1752 and input components 1754. The output components 1752 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1750 can include biometric components 1756, motion components 1758, environmental components 1760, or position components 1762, among a wide array of other components. For example, the biometric components 1756 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 can include acceleration sensor components (e.g., accelerometer), gravitation sensor components, rotation sensor components (e.g., gyroscope), and so forth. The environmental components 1760 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

The position components 1762 can include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 can include communication components 1764 operable to couple the machine 1700 to a network 1780 or devices 1770 via a coupling 1782 and a coupling 1772 respectively. For example, the communication components 1764 can include a network interface component or other suitable device to interface with the network 1780. In further examples, the communication components 1764 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 1770 can be another machine or any of a wide variety of peripheral devices (e.g., a peripheral device coupled via a USB).

Moreover, the communication components 1764 can detect identifiers or include components operable to detect identifiers. For example, the communication components 1764 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1764, such as location via Internet Protocol (IP) geolocation, location via Wi-Fi® signal triangulation, location via detecting an NFC beacon signal that may indicate a particular location, and so forth.

In various example embodiments, one or more portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1780 or a portion of the network 1780 can include a wireless or cellular network and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1716 can be transmitted or received over the network 1780 (e.g., to or from the IIoT cloud 106) using a transmission medium via a network interface device (e.g., a network interface component included in the communication components 1764) and using any one of a number of well-known transfer protocols (e.g., hypertext transfer protocol (HTTP)). Similarly, the instructions 1716 can be transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

NOTES AND EXAMPLES

Example 1 can include or use subject matter (such as an apparatus, a system, a device, a method, a means for performing acts, or a device readable medium including instructions that, when performed by the device, can cause the device to perform acts), such as can include or use a system for managing a plurality of industrial assets. In Example 1, the system includes a plurality of industrial assets, including at least first and second industrial assets, a first sensor configured to sense information about an operating or environment characteristic of the first industrial asset, a first machine module including a first processor circuit, the first machine module coupled to the first industrial asset and the first sensor, a second machine module including a second processor circuit, the second machine module coupled to the second industrial asset, and an asset cloud computing system coupled to the first and second machine modules. The asset cloud computing system can include one or more of a software-implemented asset model corresponding to at least one of the first and second industrial assets, a database configured to store the information from the first sensor about the first industrial asset, and an analyzer circuit configured to use the asset model and the information from the first sensor to identify an operating parameter update for the second industrial asset.

Example 2 can include or use, or can optionally be combined with the subject matter of Example 1, to optionally include or use a second sensor configured to sense information about an operating or environment characteristic of the second industrial asset. In Example 2, the second machine module can be coupled to the second industrial asset and the second sensor, and the asset cloud computing system can include the data configured to store the information from the first and second sensors about the first and second industrial assets; respectively. In Example 2, the analyzer circuit can be configured to apply the stored information from at least one of the first and second sensors to identify an operating parameter update for at least the second industrial asset.

Example 3 can include or use, or can optionally be combined with the subject matter of Example 2, to optionally include or use the analyzer circuit configured to identify different operating parameter updates for the first and second industrial assets.

Example 4 can include or use, or can optionally be combined with the subject matter of Example 2, to optionally include or use the analyzer circuit configured to communicate the operating parameter update for the second industrial asset to the second industrial asset using the asset cloud computing system and the second machine module.

Example 5 can include or use, or can optionally be combined with the subject matter of one or any combination of Examples 1 through 4 to optionally include or use the asset cloud computing system configured to receive, from the first sensor via the first machine module, time series data about the operating or environment characteristic of the first industrial asset.

Example 6 can include or use, or can optionally be combined with the subject matter of Example 5, to optionally include or use the first machine module configured to receive the time series data from the first sensor, update the received time series data with header or tag information, and send the updated time series data t the asset cloud computing system.

Example 7 can include or use, or can optionally be combined with the subject matter of one or any combination of Examples 1 through 6 to optionally include or use the analyzer circuit configured to apply historical and operational analytics to generate the operating parameter update using the information from the first sensor and the asset model.

Example 8 can include or use, or can optionally be combined with the subject matter of one or any combination of Examples 1 through 7 to optionally include or use a user interface device coupled to the first industrial asset, the user interface configured to receive a user input and, in response to the user input, to communicate instructions to the first industrial asset to implement or disregard the operating parameter update.

Example 9 can include or use, or can optionally be combined with the subject matter of one or any combination of Examples 1 through 8 to optionally include or use a user interface device coupled to the asset cloud computing system, the user interface configured to receive a user input and, in response to the user input, to communicate instructions to the first industrial asset to implement or disregard the operating parameter update.

Example 10 can include or use, or can optionally be combined with the subject matter of one or any combination of Examples 1 through 9 to optionally include or use a mobile device in data communication with the asset cloud computing system, the mobile device providing a user interface to receive one or more user inputs to influence the identification of the operating parameter update by the analyzer circuit.

Example 11 can include or use, or can optionally be combined with the subject matter of one or any combination of Examples 1 through 10 to optionally include or use, as the plurality of industrial assets, one or more of an engine system for aircraft, a power generation system, a power distribution system, a medical imaging system, a medical treatment system, a medical records management system, a natural resource mining system, a water processing system, a transportation system, a manufacturing system, a marine system, a datacenter system, and a vessel for navigable waters.

Example 12 can include or use, or can optionally be combined with the subject matter of one or any combination of Examples 1 through 11 to optionally include or use the software-implemented asset model configured for use in a processor-implemented simulation program to determine asset wear, asset failure modes, asset response to environmental conditions, asset fatigue, and/or asset component fatigue.

Example 13 can include or use, or can optionally be combined with the subject matter of one or any combination of Examples 1 through 12 to optionally include or use the asset cloud computing system including multiple software-implemented asset models corresponding to the first industrial asset, and wherein the analyzer circuit is configured to select for analysis one of the multiple models based on the information from the first sensor.

Example 14 can include or use, or can optionally be combined with the subject matter of one or any combination of Examples 1 through 13 to optionally include or use the first and second industrial assets including, respectively, first and second wind turbines that are geographically co-located at a wind farm.

Example 15 can include or use, or can optionally be combined with the subject matter of one or any combination of Examples 1 through 13 to optionally include or use the first and second industrial assets including, respectively, first and second jet engines that are located on different aircraft.

Example 16 can include or use subject matter (such as an apparatus, a system, a device, a method, a means for performing acts, or a device readable medium including instructions that, when performed by the device, can cause the device to perform acts), such as can include or use a method for optimizing an operation of an industrial machine. The method of Example 16 can include providing a virtual model that can be used by a processor circuit to generate, in response to at least one input condition, expected behavior information about a first industrial machine of a first type, operating multiple different physical industrial machines, wherein each of the machines corresponds to the virtual model, the operating including in at least a first environment, sensing information about a first operating characteristic for a first group of the multiple machines operating in the first environment, identifying, based on the virtual model and the sensed information about the first operating characteristic for the first group of the multiple machines, a first parameter to change an operating characteristic of a first one of the multiple machines, and receiving, at the first machine, instructions to update an operating parameter for the first machine using the first parameter to change the operating characteristic of the first machine.

Example 17 can include or use, or can optionally be combined with the subject matter of Example 16, to optionally include the sensing information about the first operating characteristic includes sensing information using sensors implemented at the respective multiple machines, and wherein the identifying the first parameter includes using a processor circuit at a remote asset cloud computing system.

Example 18 can include or use, or can optionally be combined with the subject matter of Example 17, to optionally include communicating the sensed information from the sensors to the remote asset cloud computing system, and communicating the instructions to update the operating parameter from the remote asset cloud computing system to a control circuit corresponding to the first machine, and the control circuit can define, at least in part, a behavior or operation of the first machine.

Example 19 can include or use, or can optionally be combined with the subject matter of one or any combination of Examples 16 through 18 to optionally include updating the virtual model itself using the sensed information about the first operating characteristic for each of the multiple machines operating in the first environment.

Example 20 can include or use, or can optionally be combined with the subject matter of one or any combination of Examples 16 through 19 to optionally include sensing information about the first operating characteristic for a second group of the multiple machines operating in a different second environment, and identifying the first parameter to change the operating efficiency of the first machine, the identifying based on the virtual model and based on the sensed information about the first operating characteristic for the first and second groups of machines.

Example 21 can include or use subject matter (such as an apparatus, a system, a device, a method, a means for performing acts, or a device readable medium including instructions that, when performed by the device, can cause the device to perform acts), such as can include or use a first industrial asset configured to operate in a first environment according to instructions from a first control circuit, a first sensor configured to sense information about an operating characteristic of the first asset, a second sensor configured to sense environment information about the first environment when the first asset is operational, a cloud-based processor circuit, a first communication circuit configured to send to the cloud-based processor circuit (1) the sensed information about the first asset from the first sensor and (2) the sensed environment information about the first environment from the second sensor, and a second communication circuit configured to receive, at the first control circuit for the first asset, operating instructions for the first asset generated by the cloud-based processor circuit. In Example 21, the cloud-based processor circuit can be configured to generate the operating instructions for the first asset using the sensed information about the first asset from the first sensor, the sensed environment information from the second sensor, a virtual asset model corresponding to the first industrial asset, and operating information about at least one other industrial asset.

Example 22 can include or use, or can optionally be combined with the subject matter of Example 21, to optionally include or use the second sensor configured to sense environment information about the first environment when the first asset performs a first operation, and the cloud-based processor circuit can be configured to generate the instructions for the first asset to change an operating characteristic of the first asset when the first asset performs a different second operation.

Example 23 can include or use, or can optionally be combined with the subject matter of one or any combination of Examples 21 or 22 to optionally include or use the cloud-based processor circuit configured to generate the operating instructions for the first asset using the operating information about the at least one other industrial asset, the at least one other industrial asset being geographically co-located at the same industrial facility as the first asset.

Example 24 can include or use, or can optionally be combined with the subject matter of one or any combination of Examples 21 through 23 to optionally include or use the cloud-based processor circuit configured to generate the operating instructions for the first asset using the operating information about the at least one other industrial asset, the at least one other industrial asset being located geographically remotely from the first asset.

Each of these non-limiting examples can stand on its own, or can be combined in various permutations or combinations with one or more of the other examples discussed herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system for managing a plurality of industrial assets, the system comprising:
    a plurality of industrial assets, including at least first and second industrial assets;
    a first sensor configured to sense information about an operating or environment characteristic of the first industrial asset;
    a first machine module including a first processor circuit, the first machine module coupled to the first industrial asset and the first sensor;
    a second machine module including a second processor circuit, the second machine module coupled to the second industrial asset; and
    an asset cloud computing system coupled to the first and second machine modules, the asset cloud computing system comprising:
        a virtual asset that is configured to be simulated to virtually represent a physical structure of at least one of the first and second industrial assets;
        a database configured to store the information from the first sensor about the first industrial asset; and
        an analyzer circuit configured to identify a modification to an operating parameter of a machine implemented control of the second industrial asset in response to a changing state of the physical structure of the first industrial asset detected from a simulation of the virtual asset based on the information from the first sensor; and
        push the identified modification of the operating parameter of the machine implemented control to the second industrial asset, via a network.

2. The system of claim 1, further comprising:
    a second sensor configured to sense information about an operating or environment characteristic of the second industrial asset;
    wherein the second machine module is coupled to the second industrial asset and the second sensor; and
    wherein the asset cloud computing system includes the data configured to store the information from the first and second sensors about the first and second industrial assets, respectively; and
    wherein the analyzer circuit is configured to apply the stored information from at least one of the first and second sensors to identify an operating parameter update for at least the second industrial asset.

3. The system of claim 2, wherein the analyzer circuit is configured to identify different operating parameter modifications for the first and second industrial assets.

4. The system of claim 2, wherein the analyzer circuit is configured to communicate the operating parameter modification for the second industrial asset to the second industrial asset using the asset cloud computing system and the second machine module.

5. The system of claim 1, wherein the asset cloud computing system is configured to receive, from the first sensor via the first machine module, time series data about the operating or environment characteristic of the first industrial asset.

6. The system of claim 5, wherein the first machine module is configured to receive the time series data from the first sensor, update the received time series data with header or tag information, and send the updated time series data t the asset cloud computing system.

7. The system of claim 1, wherein the analyzer circuit is configured to apply machine learning, including historical and operational analytics, to identify the operating parameter modification using the information from the first sensor and the asset model.

8. The system of claim 1, further comprising a user interface coupled to the first industrial asset, the user interface configured to receive a user input and, in response to the user input, to communicate instructions to the first industrial asset to implement or disregard an operating parameter modification.

9. The system of claim 1, further comprising a user interface coupled to the asset cloud computing system, the user interface configured to receive a user input and, in response to the user input, to communicate instructions to the first industrial asset to implement or disregard an operating parameter modification.

10. The system of claim 1, further comprising a mobile device in data communication with the asset cloud computing system, the mobile device providing a user interface to receive one or more user inputs to influence the identification of the operating parameter modification by the analyzer circuit.

11. The system of claim 1, wherein the plurality of industrial assets comprise at least one of:
    an engine system for aircraft;
    a power generation system;
    a power distribution system;
    a medical imaging system;
    a medical treatment system;
    a medical records management system;
    a natural resource mining system;
    a water processing system;
    a transportation system;
    a manufacturing system;
    a marine system;
    a datacenter system; and
    a vessel for navigable waters.

12. The system of claim 1, wherein the virtual model is configured for use in a processor-implemented simulation program to determine asset wear, asset failure modes, asset response to environmental conditions, asset fatigue, or asset component fatigue.

13. The system of claim 1, wherein the asset cloud computing system includes multiple software-implemented virtual models corresponding to the first industrial asset, and wherein the analyzer circuit is configured to select for analysis one of the multiple virtual models based on the information from the first sensor.

14. The system of claim 1, wherein the first and second industrial assets include, respectively, first and second wind turbines that are geographically co-located at a wind farm.

15. The system of claim 1, wherein the first and second industrial assets include, respectively, first and second jet engines that are located on different aircraft.

16. A method for optimizing an operation of an industrial machine, the method comprising:
   providing a virtual asset that can be used by a processor circuit to generate, in response to at least one input condition, expected behavior information about and industrial machine;
   operating multiple industrial machines, wherein each of the machines corresponds to the virtual asset;
   sensing information about a first operating characteristic for one or more of the machines during operation;
   simulating the virtual asset based on the sensed information, wherein the simulated virtual asset virtually represents a dynamic changing state of a physical structure of an industrial machine among the multiple industrial machines;
   identifying a modification to an operating parameter of a machine implemented control of the industrial machine in response to a changing state of the industrial machine detected from the simulation of the virtual asset based on the sensed information; and
   pushing the identified modification of the operating parameter of the machine implemented control to the industrial machine, via a network.

17. The method of claim 16, wherein the sensing information about the first operating characteristic includes sensing information using sensors implemented at the respective multiple machines, and wherein the identifying the modification to the operating parameter includes using a processor circuit at a remote asset cloud computing system.

18. The method of claim 17, further comprising:
   communicating the identified modification of the operating parameter to a control circuit corresponding to the industrial machine defining a behavior of the industrial machine.

19. The method of claim 16, further comprising updating the virtual asset itself using the sensed information about the first operating characteristic for each of the multiple machines.

20. A computing system comprising:
   a network interface configured to receive sensor data acquired by one or more sensors associated with an industrial machine; and
   a processor configured to simulate a virtual twin that virtually mimics a physical structure of the industrial machine based on the received sensor data, identify a change in the physical structure of the industrial machine based on a change in a virtual structure of the simulated virtual twin, and determine to modify an operating parameter of a machine-implemented control of the industrial machine based on the identified change in the physical structure based on the change in the virtual structure of the simulated virtual twin,
   wherein the processor is further configured to control the network interface to transmit the modification of the operating parameter of the machine-implemented control to a computing system associated with the industrial machine.

* * * * *